United States Patent
Yoshizawa

(10) Patent No.: US 7,796,528 B2
(45) Date of Patent: Sep. 14, 2010

(54) ELECTRONIC DEVICE CENTRALIZED MANAGEMENT APPARATUS AND ELECTRONIC DEVICE CENTRALIZED MANAGEMENT METHOD

(75) Inventor: Naomi Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 12/033,988

(22) Filed: Feb. 20, 2008

(65) Prior Publication Data

US 2008/0225732 A1 Sep. 18, 2008

(30) Foreign Application Priority Data

Mar. 13, 2007 (JP) .............................. 2007-064023

(51) Int. Cl.
 *H04L 12/26* (2006.01)
(52) U.S. Cl. ...................... 370/242; 370/252; 709/224
(58) Field of Classification Search ......... 370/241–253; 709/224, 244
See application file for complete search history.

(56) References Cited

U.S. PATENT DOCUMENTS

| 7,523,182 | B2 * | 4/2009 | Godwin | ..................... 709/223 |
| 2003/0163561 | A1 * | 8/2003 | Lee et al. | ..................... 709/224 |
| 2005/0226192 | A1 * | 10/2005 | Red et al. | ..................... 370/338 |
| 2005/0235058 | A1 * | 10/2005 | Rackus et al. | ............... 709/224 |

FOREIGN PATENT DOCUMENTS

JP 2006-149873 6/2006

* cited by examiner

*Primary Examiner*—Ricky Ngo
*Assistant Examiner*—Wei-Po Kao
(74) *Attorney, Agent, or Firm*—Staas & Halsey LLP

(57) ABSTRACT

An electronic device centralized management apparatus manages a device connected through a network remotely. The apparatus stores information received from the device; extracts information based on a designated attribute of the device from the stored information; and compares a tendency held by the extracted information to a tendency held by the stored information to extract a difference therebetween.

6 Claims, 25 Drawing Sheets

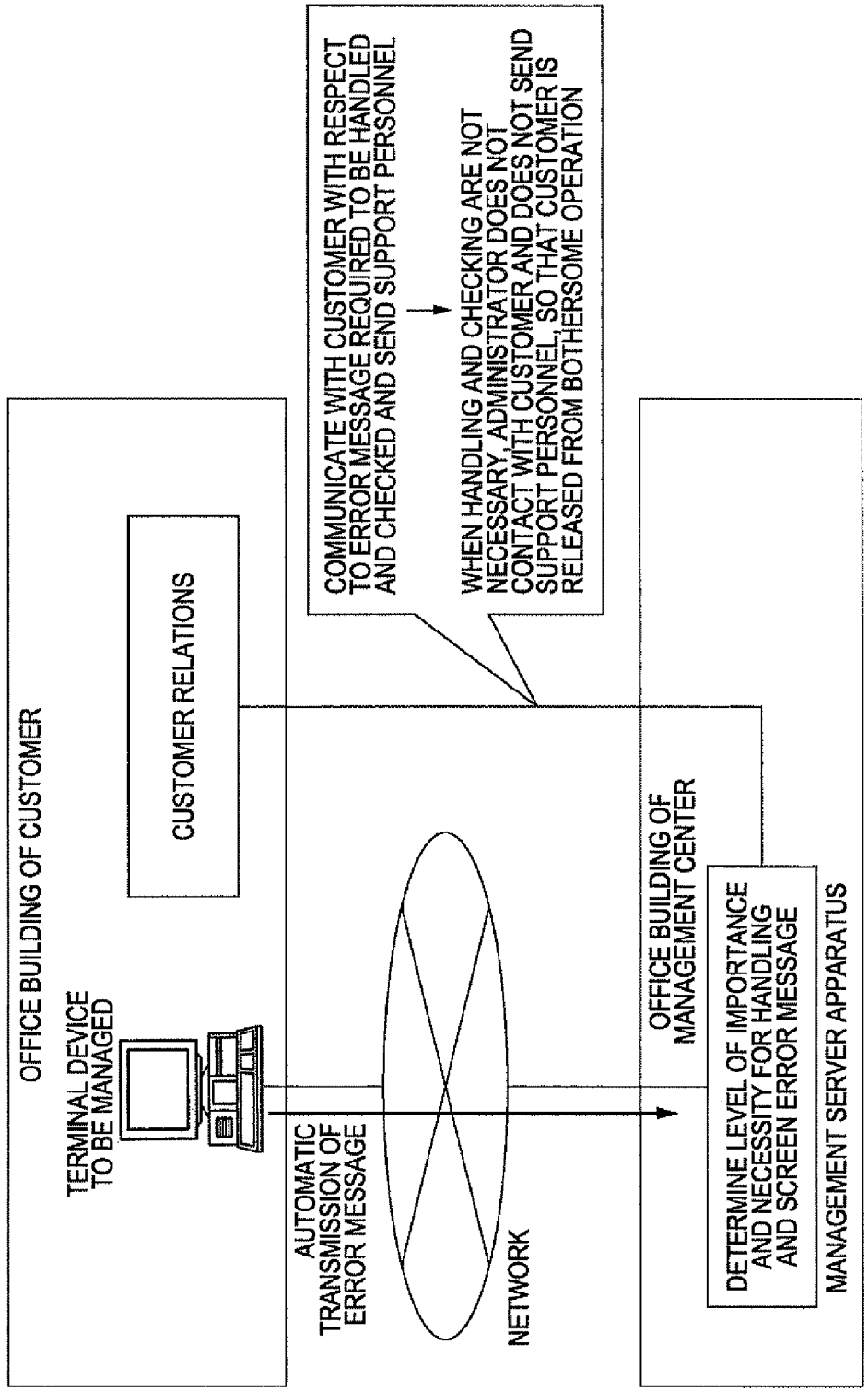

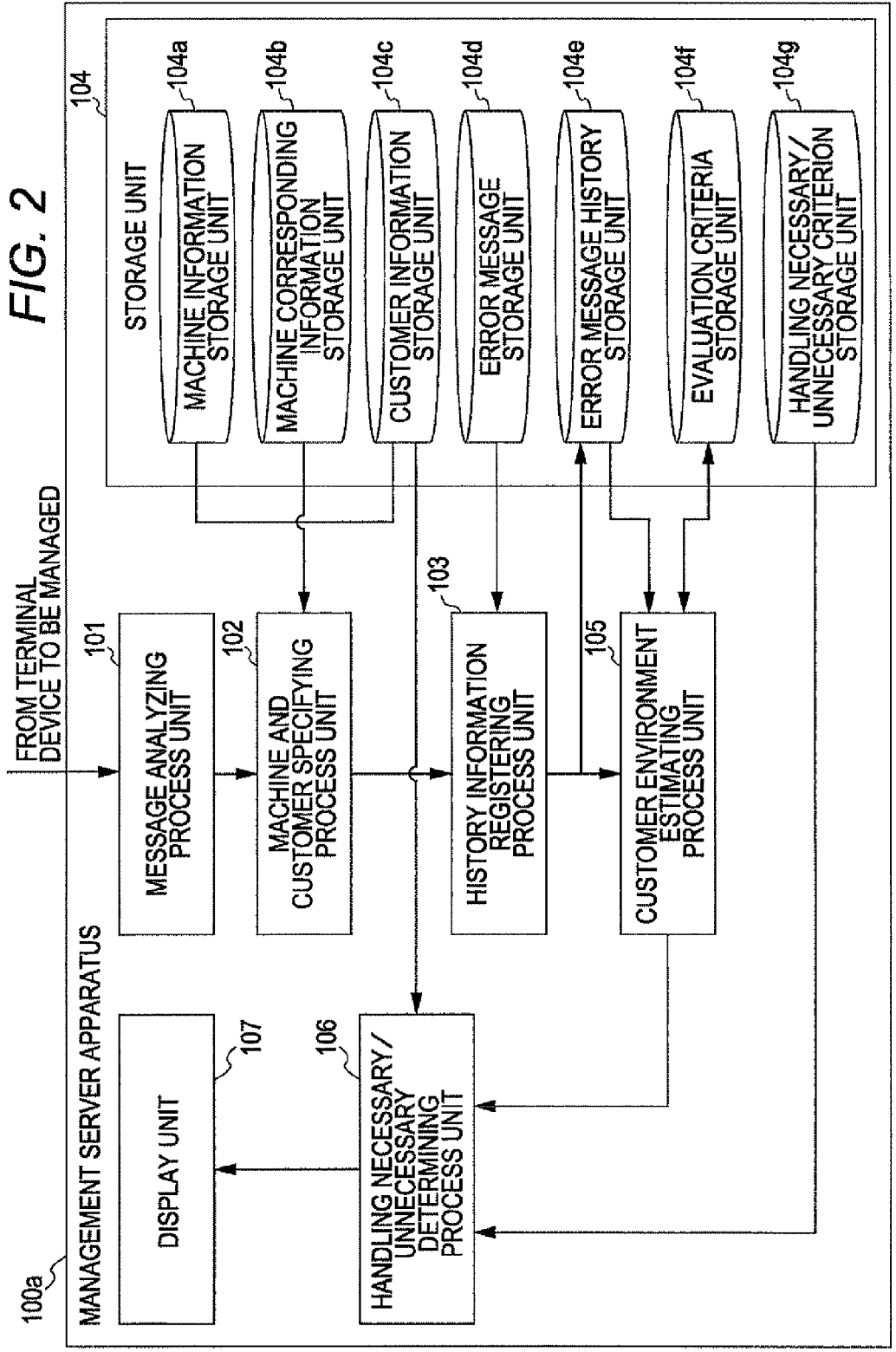

FIG. 3A

RMS9001E-1450 UNITID=00PMRGYRX100S2PGR10237S, 2006/09/01, 15:17:37

FIG. 3B

From:2GRSV02.departB.companyA.co.jp
To: PG.support.fujitsu.com
RMS9001E-1450 UNITID=00PMRGYRX100S2PGR10237S, 2006/09/01, 15:17:37

FIG. 3C

From:2GRSV02.departB.companyA.co.jp
ReceiverFrom: 134.253.10.3
To: PG.support.fujitsu.com ERROR-CODE =RMS9001E-1450
UNITID=00PMRGYRX100S2PGR10237S,
ERROR-TIME=2006/09/01, 15:17:37,
SEND-TIME=2006/09/01, 15:17:37,
ERROR-MSG=Temperature at HDD0 in cabinet 0 of 2GRSV02 has reached the warning level., ...
 ERROR-CONTENTS=Temperature at  in  of ** has reached the warning level
 DEV-NAME= cabinet 0:HDD0
 HOST-NAME=2GRSV02

FIG. 4

| MACHINE ID | DEVICE NAME | TYPE NAME | MODEL NAME | DEVICE NUMBER |
|---|---|---|---|---|
| 1 | RTR0324 | FMVLX50TM | FM-AT | 1 |
| 2 | 2GRSV01··· | PMRGYRX100S2 | PG | 1 |
| 3 | 2GRSV01··· | PMRGYRX100S2 | PG | 2 |
| 4 | MGP01.tv | MGP3124AT | ST | 1 |
| 5 | MGP01.tv | MPF6333I | ST | 3 |
| 6 | FMV10F.labs.B.co.jp | ··· | ··· | ··· |
| ··· | ··· | ··· | ··· | ··· |

FIG. 5

| CUSTOMER ID | MACHINE ID |
|---|---|
| 1 | 1 |
| 2 | 4 |
| 2 | 5 |
| 3 | 2 |
| 3 | 3 |
| 4 | 6 |
| 5 | 7 |
| ⋮ | ⋮ |

FIG. 6

| CUSTOMER ID | CUSTOMER NAME | ADDRESS | INDUSTRY TYPE | PERSON IN CHARGE | REGISTRATION DATA | SERVICE START DATE AND TIME | MAIL ADDRESS | ... |
|---|---|---|---|---|---|---|---|---|
| 1 | COMPANY A | SHINJYUKU-KU, TOKYO-TO | MANUFACTURING INDUSTRY | AIDA | 2003/1/2 | 2002/12/20 | G1.departC.companyA.co.jp | ⋮ |
| 2 | LABORATORY B | KAWASAKI-SHI, KANAGAWA-KEN | RESEARCH AND DEVELOPMENT | ISHIKAWA | 2003/2/3 | 2003/2/3 | ⋮ | ⋮ |
| 3 | COMPANY A | SHINJYUKU-KU, TOKYO-TO | MANUFACTURING INDUSTRY | UTSUKI | 2003/3/4 | 2003/6/7 | departB.companyA.co.jp | ⋮ |
| 4 | INCORPORATED COMPANY C | HIGASHI-OOSAKA-SHI, OOSAKA-FU | RESEARCH AND DEVELOPMENT | ENOKIDA | 2003/4/5 | 2003/4/5 | ⋮ | ⋮ |
| ⋮ | ⋮ | ⋮ | ⋮ | ⋮ | ⋮ | ⋮ | ⋮ | ⋮ |

FIG. 7

| ERROR MESSAGE CODE | ERROR MESSAGE |
|---|---|
| RMS9001E-0010 | . . . |
| RMS9001E-0020 | DEVICE ** HAS ILLEGAL BLOCK |
| . . . | Expire Time 5 |
| RMS9001E-1450 | Temperature at ** in ** of has reached |
| RMS9120E-0010 | . . . |
| ⋮ | ⋮ |

FIG. 8

| REGISTRATION DATE AND TIME | DEVICE NAME | HOST NAME | MACHINE ID | ... | CUSTOMER ID |
|---|---|---|---|---|---|
| 2006/9/1 15:12 | 00GP5000M380##GP53851C6###BBSP014A00006# | server3.orgC.co.jp | ... | ... | 6798465 |
| 2006/9/1 15:13 | F6410340 210026604 083344603 | masui-server.10.24.155.293 | ... | ... | 8344603 |
| ... | ... | ... | ... | ... | ... |

| CUSTOMER ID | CUSTOMER NAME | POSITION | ERROR-CODE |
|---|---|---|---|
| 6798465 | INCORPORATED COMPANY | INFORMATION SYSTEM DIVISION | RMS9001E-5487 |
| 8344603 | ... | ... | RMS9001E-1460 |
| ... | ... | ... | ... |

| MSG |
|---|
| UNITID=00PRIMEPOWER#1Cabinet#1–FAN#10 Expire Time |
| UNITID=00PMRGYRX100S2PGR10237S Temperature at sensor ** in cabinet ** of server ** has reached the warning level. |
| ... |

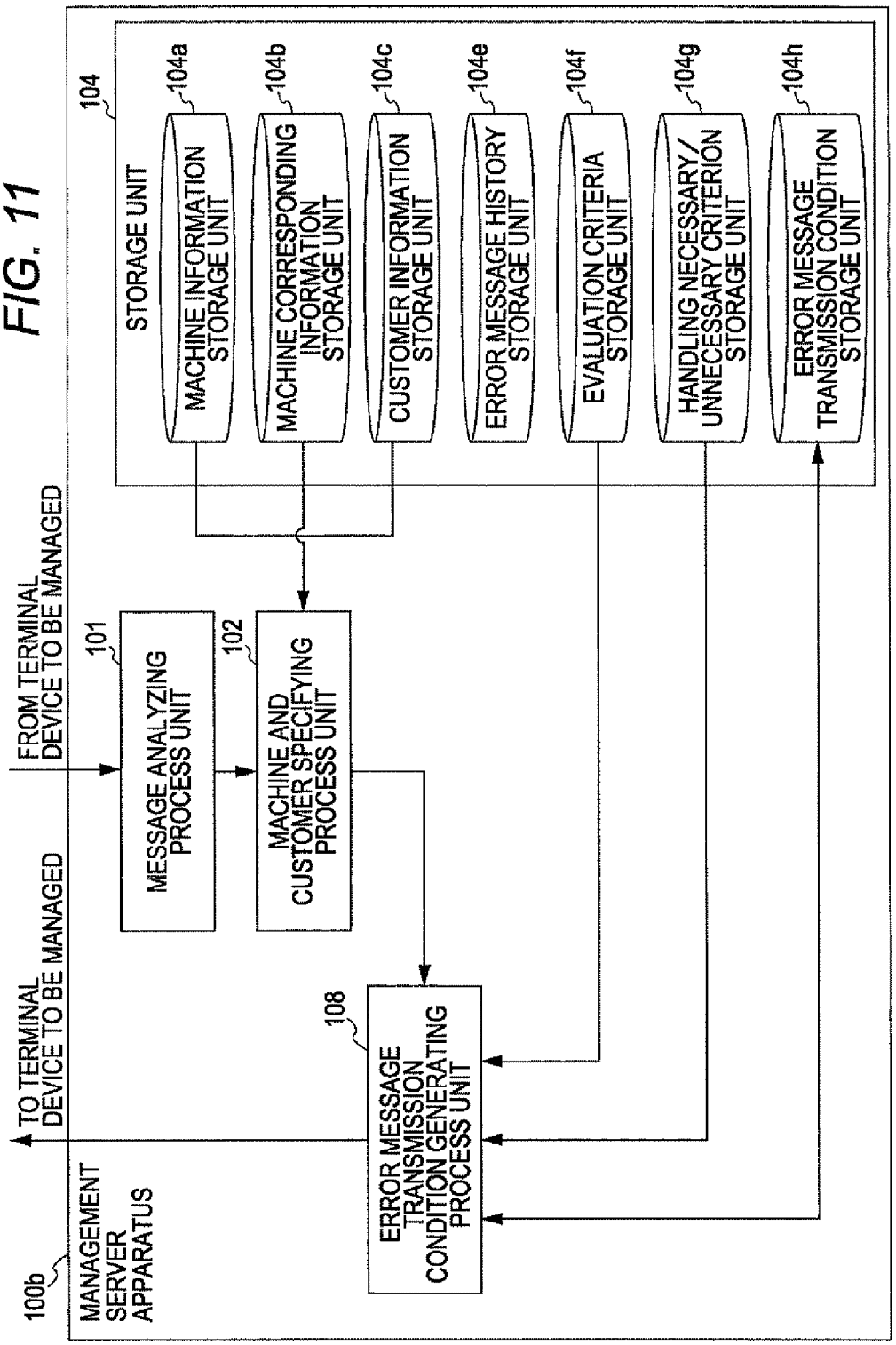

FIG. 12

| EDITION NUMBER | REGISTRATION DATE AND TIME | DEVICE NAME | HOST NAME | MACHINE ID | ... |
|---|---|---|---|---|---|
| 1 | 2006/9/1 15:12 | 00GP5000M380##GP53851C6###BBSP014A00006# | server3.orgC.co.jp | ... | ... |
| 2 | 2006/9/1 15:13 | F6410340 21002604 08344603 | masui-server.10.24.155.293 | ... | ... |
| ... | ... | ... | ... | ... | ... |

| CUSTOMER ID | CUSTOMER NAME | POSITION | ERROR-CODE |
|---|---|---|---|
| 6798465 | INCORPORATED COMPANY | INFORMATION SYSTEM DIVISION | RMS9001E-5487 |
| 8344603 | ... | ... | RMS9001E-1460 |
| ... | | | ... |

| MSG |
|---|
| UNITID=00PRIMEPOWER#1Cabinet#1-FAN#10 Expire Time |
| UNITID=00PMRGYRX100S2PGR10237S Temperature at sensor ** in cabinet ** of server ** has reached the warning level. |
| ... |

FIG. 13

| CUSTOMER ID | MACHINE ID | MESSAGE TRANSMISSION CONDITION ITEM | MESSAGE TRANSMISSION CONDITION |
|---|---|---|---|
| 1 | 1 | EDITION NUMBER | 1 |
| | | TEMPERATURE | 38°C OR MORE |
| | | CPU UTILIZATION | 80% OR MORE |
| | | MEMORY LEAKAGE | PRESENCE |
| | | NUMBER OF ERROR MESSAGE TRANSMISSIONS | 30 TIMES OR MORE |
| . . . | . . . | . . . | . . . |

FIG. 15

| ERROR MESSAGE CODE | NUMBER OF TRANSMISSIONS |
|---|---|
| RMS9001E-0010 | 0 |
| RMS9001E-0020 | 1 |
| ... | ... |
| RMS9001E-1450 | 50 |
| RMS9120E-0010 | 5 |
| ⋮ | ⋮ |

FIG. 16

| | |
|---|---|
| EDITION NUMBER | 1 |
| TEMPERATURE | 38°C OR MORE |
| CPU UTILIZATION | 80% OR MORE |
| MEMORY LEAKAGE | OCCURRENCE |
| NUMBER OF ERROR MESSAGE TRANSMISSION | 30 TIMES OR MORE |
| ⋮ | ⋮ |

FIG. 17A

Update Request UNITID=00PMRGYRX100S2PGR10237S, 2006/09/01, 15:17:37, Ver.1, ···

FIG. 17B

From:2GRSV02.departB.companyA.co.jp
To: PG.support.fujitsu.com

Update Request UNITID=00PMRGYRX100S2PGR10237S, 2006/09/01, 15:17:37,Ver1, ···

FIG. 17C

From: 2GRSV02.departB.companyA.co.jp
ReceiverFrom: 134.253.10.3
To: PG.support.fujitsu.com Update Request
UNITID=00PMRGYRX100S2PGR10237S,
TIME=2006/09/01, 15:17:37,
SEND-TIME=2006/09/01, 15:17:37,
Ver=Ver.1

ELECTRONIC DEVICE CENTRALIZED MANAGEMENT APPARATUS AND ELECTRONIC DEVICE CENTRALIZED MANAGEMENT METHOD

BACKGROUND OF THE INVENTION

1. Field of the Invention

Failure management of electronic devices has been become more important with recent advances in electronic devices. However, since it is not efficient to manage electronic devices independently, an electronic device centralized management system which performs centralized management to a plurality of electronic devices through a network is generally used.

2. Description of the Related Art

In the electronic device centralized management system, when a failure or an abnormality occurs in a terminal device, the electronic device remotely notifies a management server device of the electronic device centralized management system that the failure or the abnormality occurs.

SUMMARY

There is provided an electronic device centralized management apparatus which remotely manages a device connected through a network comprising: a received information storing unit which stores information received from the device to be managed; an information extracting unit which extracts information based on a designated attribute of the device to be managed from the information stored by the received information storing unit; and a comparing unit which compares a tendency held by the information extracted by the information extracting information with a tendency held by the information stored by the received information storing unit to extract a difference therebetween.

The above-described embodiments of the present invention are intended as examples, and all embodiments of the present invention are not limited to including the features described above.

BRIEF DESCRIPTION OF THE DRAWINGS

FIG. 1 is an explanatory diagram for explaining an outline of the present invention;

FIG. 2 is a functional block diagram showing a configuration of a management server apparatus according to a first embodiment;

FIG. 3A is a diagram showing an error warning output from a terminal device to be managed in the first embodiment;

FIG. 3B is a diagram showing an example of an error message transmitted from the terminal device to be managed to the management server apparatus in the first embodiment;

FIG. 3C is a diagram showing an example of an analyzing result of the error message received from the terminal device to be managed in the first embodiment;

FIG. 4 is a diagram showing an example of a machine information table in the first embodiment;

Figure 5:
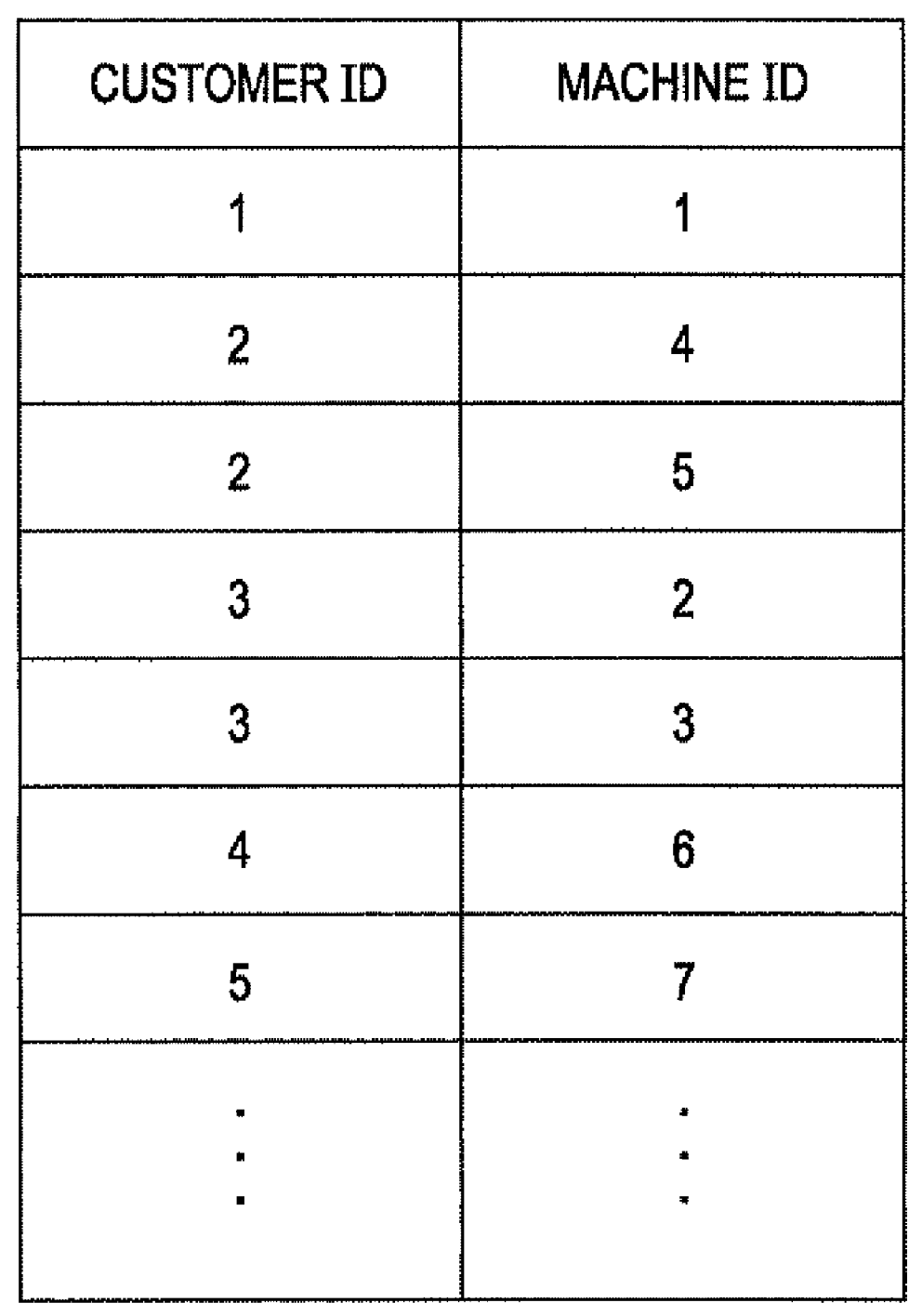

FIG. 5 is a diagram showing an example of a machine corresponding information table in the first embodiment;

FIG. 6 is a diagram showing an example of a customer information table in the first embodiment;

FIG. 7 is a diagram showing an example of an error message table in the first embodiment;

FIG. 8 is a diagram showing an example of an error message history table in the first embodiment;

FIG. 11 is a functional block diagram showing a configuration of a management server apparatus according to a second embodiment;

FIG. 12 is a diagram showing an example of an error message history table in the second embodiment;

FIG. 13 is a diagram showing an example of an error message transmission condition in the second embodiment;

FIG. 15 is a diagram showing an example of a number-of-error-message-transmissions storage table;

FIG. 16 is a diagram showing an example of an error message transmission condition table;

FIG. 17A is a diagram showing an error message transmission condition updating request output by the terminal device to be managed in the second embodiment;

FIG. 17B is a diagram showing an example of the error message transmission condition updating request transmitted from the terminal device to be managed to the management server apparatus in the second embodiment;

FIG. 17C is a diagram showing an example of an analysis result of the error message transmission condition updating request received from the terminal device to be managed in the second embodiment;

DETAILED DESCRIPTION OF THE PREFERRED EMBODIMENTS

Figure 9:
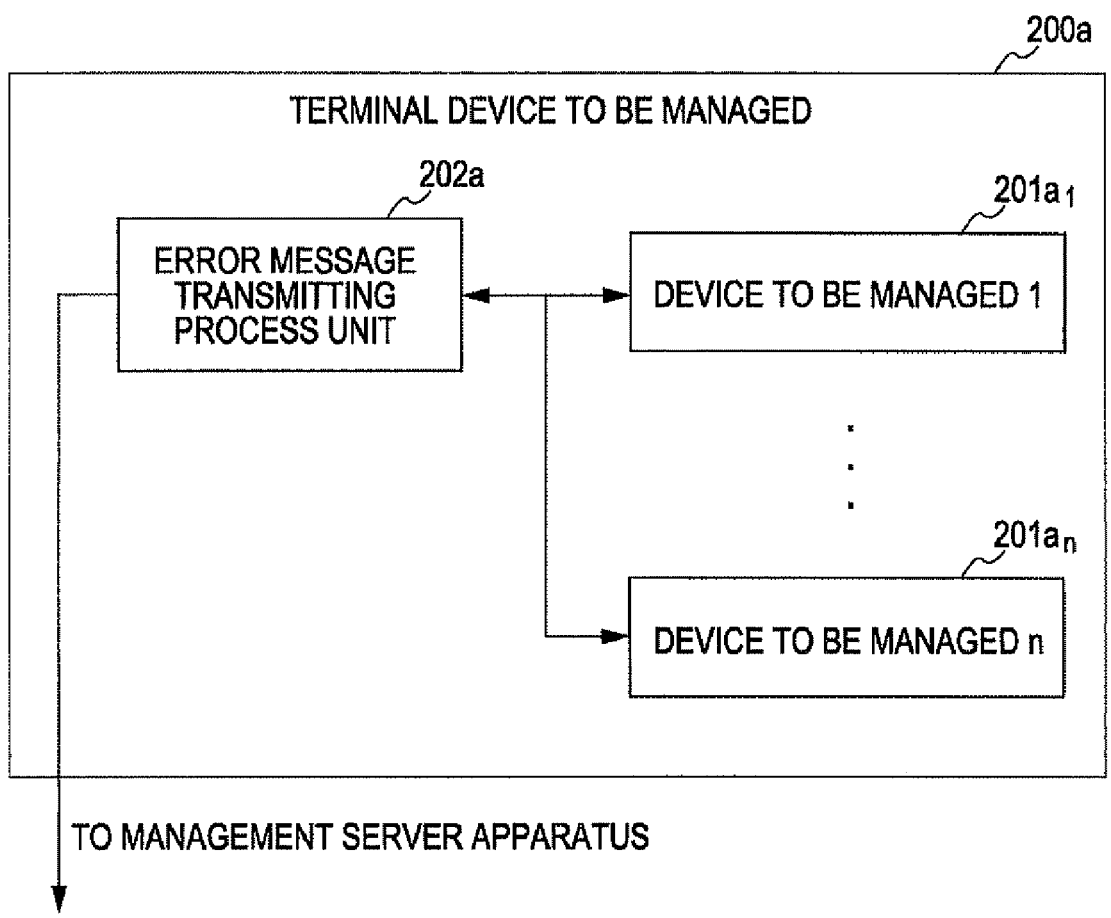
FIG. 9 is a functional block diagram showing a configuration of the terminal device to be managed according to the first embodiment.

Reference may now be made in detail to embodiments of the present invention, examples of which are illustrated in the accompanying drawings, wherein like reference numerals refer to like elements throughout.

As a typical example of electronic device centralized management system, for example, in Japanese Patent Application Laid-Open (JP-A) No. 2006-149873, a medical device management apparatus which manages medical devices as electronic devices to be managed, accumulates an operation state, abnormality information, and failure information notified from the medical devices, and specifies a medical device in which a failure probably occurs on the basis of the accumulated information and the accumulated operation state. According to the medical device management apparatus, since failure of the medical device is predicted with a high degree of accuracy, accurate and wasteless handling is possible with respect to sending maintenance personnel.

Embodiments of an electronic device centralized management program, an electronic device centralized management apparatus, and an electronic device centralized management method of the present invention will be described in detail with reference to the accompanying drawings. In the first and second embodiment described below, electronic devices are used as a plurality of terminal devices, the plurality of terminal devices are connected to one management server apparatus through a network, and failures occurring in the plurality of terminal devices are concentrically managed by the management server apparatus. Each terminal device notifies the management server apparatus of the failures occurring in constituent elements thereof as an error message (failure message or warning message) through the network to cause the management server apparatus to warn about the failures. In this manner, an administrator of the management server apparatus can recognize the failures occurring in the terminal devices.

In the first and second embodiment, electronic devices are used as a plurality of terminal devices, and the plurality of terminal devices are managed by one management server apparatus. However, the present invention is not limited to this configuration, and the number of terminal devices and the number of management server apparatuses may be arbitrarily set. Any electronic device which has a network connection function and a notification function to the management server apparatus can be used. For example, various communication repeating devices including routers or hubs or a dedicated device such as an ATM (Automatic Teller Machine) or a CD (Cash Dispenser) for a specific process may be used.

The following first and second embodiments describe a case in which a temperature of a magnetic storage device held by a terminal device is managed. In this case, when the temperature of the magnetic storage device falls within a wider allowable range, an error message which notifies of temperature abnormality is suppressed under a predetermined condition, so that contact with a customer and sending of personnel for handling can be suppressed. However, a device to be managed by a terminal is not limited to the magnetic storage device, and an item to be managed is not limited to the temperature.

For example, a terminal device to be managed of a specific machine type of a certain customer has a resistance to heat the temperature of which is higher than an allowable temperature (for example 38° C.) in the setting. Even though a heat generation temperature exceeds the allowable temperature in the setting, when it is found that a supposed failure probability is low, an error message which notifies of temperature abnormality under a predetermined condition is suppressed from being displayed. In this manner, an administrator of a system including a terminal device to be managed can be suppressed from communicating with a user of the terminal or sending personnel for handling of a location of a device in which a failure occurs.

In this case, the magnetic storage device has a self-diagnosing function called a S.M.A.R.T (Self-Monitoring, Analysis and Reporting Technology), and the terminal device to be managed can collate an internal temperature of the magnetic storage device. The terminal device to be managed collates a temperature of the magnetic storage device at predetermined time intervals. When the temperature is equal to or higher than a predetermined temperature (for example, 30° C.), the terminal device to be managed generates a warning message serving as a kind of error message.

In the following first and the second embodiments, information transmitted from the terminal device to be managed to the management server apparatus is an error message. However, the information is not limited to the error message, and information which notifies the management server apparatus of various states may be used. The "failure" in the following embodiments includes not only a failure which causes an enormous influence but also a minor trouble such as shortage of toner in a printer or battery shutoff.

Prior to the explanation of the first and second embodiment, an outline of the present invention will be described below. FIG. 1 is an explanatory diagram for explaining the outline of the invention. As shown in FIG. 1, in an office building of the customer, a terminal device to be managed is installed, and customer relations are established. The terminal device to be managed is a general computer. The customer relations include a telephone window where a call-taker is assigned.

On the other hand, in an office building of a management center, a management server apparatus is installed. In the management server apparatus, a full-time administrator checks information displayed on a display unit of the management server apparatus. The terminal device to be managed and the management server apparatus are connected to each other through a network. The terminal device to be managed sends an error message which warns or notifies the management server of an error or a failure occurring in the terminal device to be managed to the management server apparatus.

The management server apparatus determines a level of importance and necessity for handling of an error message received from the terminal device to be managed to screen the error message and displays a screening result on the display unit. On the display unit, only an error message having a high level of importance and necessity for handling is displayed.

The administrator of the management server apparatus makes contact with the customer relations by a telephone or the like to confirm the error message on the basis of the error message screened and displayed as described above. More specifically, the administrator makes contact with a customer in relation to only an error message which requires handling and check and sends support personnel. For this reason, when handling and check are unnecessary, the administrator does not make contact with the customer and does not send support personnel. Therefore, the customer is released from the bothersome operation.

First Embodiment

A first embodiment of the present invention will be described below with reference to FIGS. 2 to 10 and FIGS. 20 to 28. An outline of the first embodiment is as follows. The management server apparatus accumulates an error message which notifies the management server apparatus of an error such as a warning or a failure received from the terminal device to be managed. The management server apparatus analyzes the accumulated error message on the basis of a customer environment where the terminal device to be managed is installed and a customer attribute to calculate an error occurrence tendency based on the environment and the customer attribute. The management server apparatus estimates the customer environment by using a difference between the calculation result and the error occurrence tendency indicated by all error messages as an evaluation criterion. The estimated customer environment and a predetermined handling necessary/unnecessary criterion are compared with each other. On the basis of the comparison result, necessity of handling and checking of a customer is determined.

When it is determined by the management server apparatus that the handling and checking of the customer are necessary, the administrator of the management server apparatus makes contact with the customer and sends support personnel. When it is determined that the handling and the checking of the customer are not necessary, the administrator does not perform both the handling and the checking. More specifically, the first embodiment is an embodiment in which the management server apparatus has a function of screening an error message.

The configuration of the management server apparatus according to the first embodiment will be described below. FIG. 2 is one example of a functional block diagram showing a configuration of the management server apparatus according to the first embodiment. As shown in FIG. 2, a management server apparatus 100a has a message analyzing process unit 101, a machine and customer specifying process unit 102, a history information registering process unit 103, a storage unit 104, a customer environment estimating process unit 105, a handling necessary/unnecessary determining process unit 106, and a display unit 107 serving as a display means.

The storage unit 104 further has a machine information storage unit 104a, a machine corresponding information storage unit 104b, a customer information storage unit 104c, an error message storage unit 104d, an error message history storage unit 104e, an evaluation criteria storage unit 104f, and a handling necessary/unnecessary criterion storage unit 104g.

The message analyzing process unit 101 analyzes an error message received as, for example, an electronic mail from the terminal device to be managed to verify the propriety of a mail header or a mail text, to check whether a proper content is transmitted from a proper transmission source, and to clarify correspondence between a specific item and a specific content.

For example, by the form shown in FIG. 3A, an error is output from the terminal device to be managed. This error message has a structure formed such that an error message code, a unit ID (Identification) obtained by combining a device name and a type name, an error occurrence date, error occurrence time, and the like are separated by commas in a comma separated value (CSV) format.

An error of the format shown in FIG. 3A is converted into an error of a mail format to which a "From" header and a "To" header shown in FIG. 3B are added. The mail is transmitted from the terminal device to be managed to the management server apparatus 100a through a network. Due to the band limiting of the network, only a device configuration when a warning is issued and a mail text are transmitted, and information in a past normal state is not transmitted by the mail.

When the mail of the error message is received in the format shown in FIG. 3B by the management server apparatus 100a, the message analyzing process unit 101 analyzes the received mail and determines a warning content, customer information (customer name, address, and industry type), machine information of the terminal device to be managed (device name, type name, model name, and device number), a registration date, a service start date, the number of times of issuance of a warning related to a failure since handling of the same past failure, and the like.

The machine and customer specifying process unit 102 specifies machine information (device name, type name, machine type name, and device number) of the terminal device to be managed and customer information (customer name, address, industry type) on the basis of the analysis result obtained by the message analyzing process unit 101 with reference to the machine information stored in the machine information storage unit 104a, the machine corresponding information stored in the machine corresponding information storage unit 104b, and the customer information stored in the customer information storage unit 104c. An example of a machine information table in which the machine information stored in the machine information storage unit 104a is stored is shown in FIG. 4. An example of the machine corresponding information table in which the machine corresponding information stored in the machine corresponding information storage unit 104b is stored is shown in FIG. 5. An example of a customer information table in which the customer information stored in the customer information storage unit 104c is stored is shown in FIG. 6.

The history information registering process unit 103 causes an error message code to correspond to an error message with reference to an error message stored in the error message storage unit 104d. In this manner, an analysis result of the error message as shown in FIG. 3C is completed. The history information registering process unit 103 stores the analysis result in the error message history storage unit 104e. The history information is used to determine whether handling is necessary or unnecessary for a warning message of the same type which will occur in the future. An example of an error message table in which an error message stored in the error message storage unit 104d is stored is shown in FIG. 7. An example of an error message history table stored in the error message history storage unit 104e is shown in FIG. 8.

On the assumption that the error message history is sufficiently accumulated by the history information registering process unit 103, the customer environment estimating process unit 105 performs the following process in a predetermined cycle. First, an evaluation criterion average to be compared with an evaluation criterion is determined. The evaluation criterion average is a value expressing a relationship between the number of times of issuance of messages for waning of the failure since past handling of each failure and a failure probability of occurrence of the failure in the state.

It is assumed that a correspondence between the number N of times of issuance of a certain error message M and a failure probability, which is calculated from an error message history, is called an average failure probability approximate expression. According to the average failure probability approximate expression, an average failure probability $B_0$ is expressed as follows by a certain function F.

[Equation 1]

$$B_0 = F(M,N) \qquad (1)$$

This equation (1) is obtained as follows. More specifically, error messages of the error message history are time-sequentially ordered by date of issuance and a machine type ID is fixed (machine type ID=k) when a failure E which causes issuance of the error message M occurs between an (N−1)th failure and an Nth failure of the error message M, the failure probability is 0 until the (N−1)th failure, and the failure prob ability is 1 when the Nth failure occurs. This is expressed by a numerical expression, the following equation is obtained:

[Equation 2]

$$F_{MACHINE\ ID=k}(M, N-1)=0 \qquad (2)$$

[Equation 3]

$$F_{MACHINE\ ID=k}(M,N)=1 \qquad (3)$$

In this case, F machine type ID=k (M, N−1) of Equation (2) and F machine ID=k (M, N) of Equation (3) expresses failure probabilities when a machine ID is fixed to k. Therefore, a probability of issuance of the error message M in the future is calculated by the following equation:

$$B_0=F(M,N)=\text{Average}(F_{MACHINE\ ID=k}(M,N)) \qquad \text{[Equation 4]}$$

Figure 20:
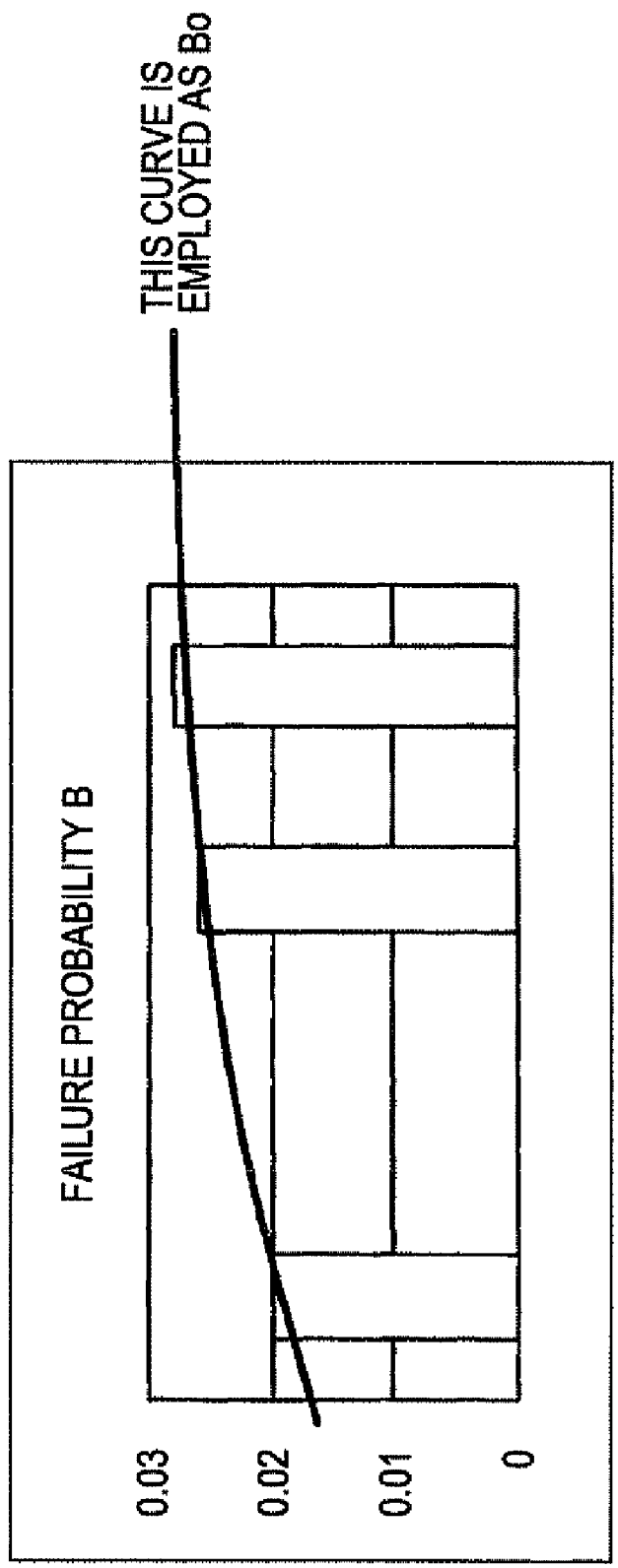
FIG. 20 is a diagram showing an average failure probability.

In this case, "Average(*)" denotes a function to calculate an average of all the machine IDs. A value $B_0$ calculated in this manner is evaluation criterion average to calculate difference between the probability and the average. When the number of generated failures is 0, interpolation may be performed by using a known method such as smoothing, a method of moving average, a Newton method, or a Spline method. The average failure probability $B_0$ calculated in this manner is expressed by a curve as shown in FIG. 20.

In the first embodiment, since the explanation is made such that a temperature abnormality of a magnetic storage device of the terminal device to be managed is focused, a value $B_0$ is the evaluation criterion average related to the magnetic storage device. However, when the device to be managed by the terminal device to be managed includes not only a magnetic storage device but also another device such as a CPU fan, evaluation criterion averages change depending on devices. In this case, with respect to a device in which the number of warning messages is predetermined number or more, the evaluation criterion average is calculated. Alternatively, a device in which the evaluation criterion average is a predetermined value or less is not targeted, so that labor for calculation may be reduced.

The customer environment estimating process unit 105 estimates a customer environment type, i.e., creates an evaluation criterion. It is assumed that the evaluation criterion is updated in a predetermined cycle like the evaluation criterion average. It is assumed that an error message history is sufficiently accumulated.

The evaluation criterion is created as follows such that respective parameters are fixed. First, the evaluation criterion is created for each industry type of customers. An evaluation criterion $B_1$ for each industry type of the customers, like the evaluation criterion average $B_0$, is expressed by the following equation by using a certain function F.

$$B_1=F_{INDUSTRY\ TYPE=g}(M,N) \qquad \text{[Equation 5]}$$

Figure 21:
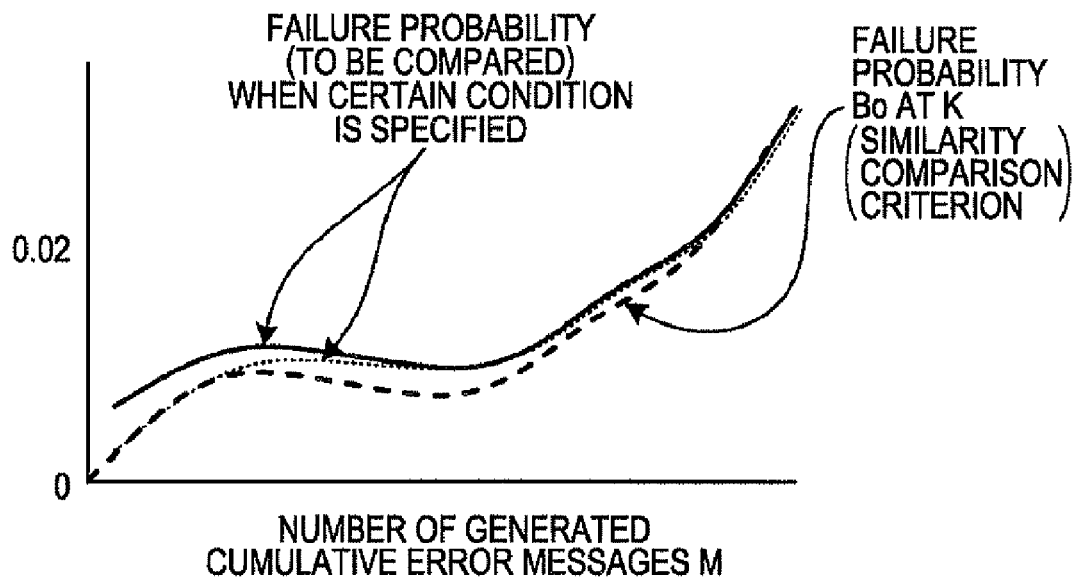
FIG. 21 is a diagram showing an example obtained when an evaluation criterion is regarded to be similar to the average failure probabilities.
Figure 22:
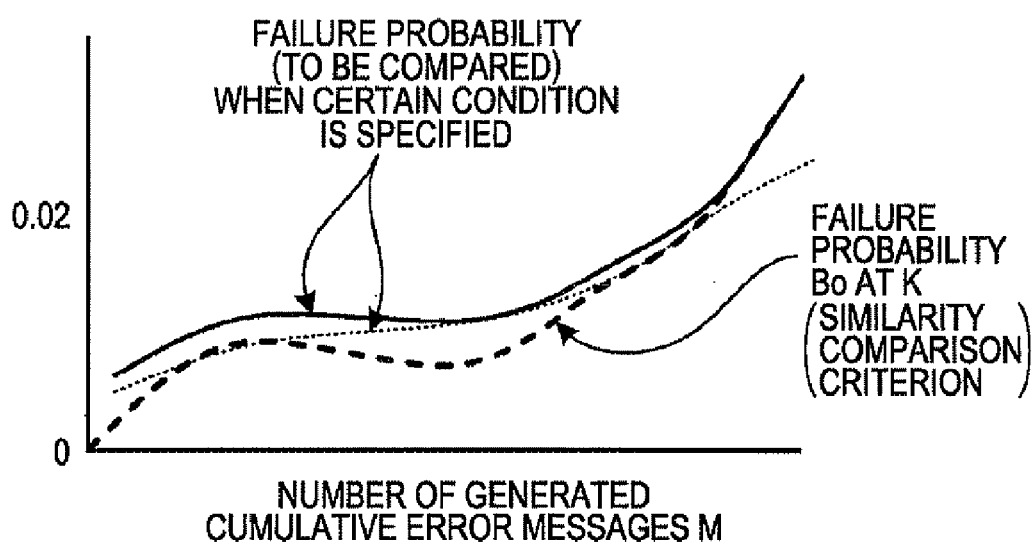
FIG. 22 is a diagram showing an example obtained when an evaluation criterion is not regarded to be similar to the average failure probabilities.

F industry type=g(M, N) is an evaluation criterion calculated by fixing an industry type of a customer to "g". The evaluation criterion $B_1$ of all industry types are calculated, and matching between a curve of each evaluation criterion and a curve of the evaluation criterion average $B_0$ is checked to make it possible to know whether a specific industry type is deviated from the evaluation criterion average, i.e., the industry type has a deviation. A degree of matching between the curves is determined by a known method. The degree of matching is expressed by a value of 0 or more and less than 1. The degree of matching is in proportion when the value is closer to 1. When the degree of matching is, for example, 0.8 or more, it can be regarded that the two curves are sufficiently matched with each other (sufficiently similar to each other and no deviation). The similar state is as shown in, for example, FIG. 21. The similar state is a state in which by using the failure probability $B_0$ at a point K in FIG. 21 as similarity comparison criterion and a failure probability obtained when a certain condition in FIG. 21 is specified as an object to be compared, both the curves are approximate to each other. In contrast to this, when the degree of matching is less than 0.8, it is regarded that the two curves are not matched (deviated). This unmatching state is as shown in, for example, FIG. 22. The state is a state in which, by using the failure probability $B_0$ at the position K in FIG. 22 as a similarity comparison criterion and a failure probability obtained when a certain condition in FIG. 22 is specified as an object to be compared, both the curves are deviated from each other.

In this manner, the evaluation criterion $B_1$ of the industry type which is determined to be unmatched with the evaluation criterion average $B_0$ is considered to have a deviation with respect to the industry type, and the industry type and the evaluation criterion $B_1$ are caused to be correspond to each other and stored in the predetermined table of the evaluation criteria storage unit 104*f*.

Similar to the industry type of the customer, an evaluation criterion in which an address of a customer is fixed to "j" is created. An evaluation criterion $B_2$ set for each address of customers, similar to the evaluation criterion average $B_0$, is expressed as the following equation:

[Equation 6]

$$B_2=F_{ADDRESS=j}(M,N) \qquad (6)$$

$B_2$ is calculated for each of all addresses. Matching between curves of the respective evaluation criteria and the curve of the evaluation criterion average $B_0$ are checked to make it possible to know a specific address deviated from the evaluation criterion average.

Like the industry type of the customer, an evaluation criterion in which a type name is fixed to "f" is created. An evaluation criterion $B_3$ is expressed by the following equation by using a certain function F.

[Equation 7]

$$B_3=F_{F\ TYPE\ NAME=f}(M,N) \qquad (7)$$

$B_3$ is calculated for each of all types. Matching between curves of the respective evaluation criterion and the curve of the evaluation criterion average $B_0$ are checked to make it possible to know a specific type name deviated from the evaluation criterion average.

Like the industry type of the customer, an evaluation criterion in which a service period of the terminal device to be managed is fixed to "t" is created. An evaluation criterion $B_4$ is, similar to the evaluation criterion average $B_0$, expressed by the following equation by using a certain function F. As the service period, a period divided into predetermined sections in advance as needed such as less than two years elapsed from the start of the service, two years to less than three years elapsed from the start of the service, three years to less than five years elapsed from the start of the service, or five years or more elapsed from the start of the service is used. The service period can be calculated from a difference between a present system date and a service start date.

[Equation 8]

$$B_4=F_{SERVICE\ PERIOD=t}(M,N) \qquad (8)$$

$B_4$ is calculated for each of all types. Matching between curves of the respective evaluation criterions and the curve of the evaluation criterion average $B_0$ are checked to make it possible to know a specific type name deviated from the evaluation criterion average.

In this manner, the evaluation criterion $B_2$, the evaluation criterion $B_3$, and the evaluation criterion $B_4$ of the address, the type namer and the service period which are not determined to be matched with the evaluation criterion average $B_0$ are considered to be deviated with respect to the address, the type name, and the service period, and the address, the type name, and the service period and the evaluation criterion $B_2$, the evaluation criterion $B_3$, and the evaluation criterion $B_4$ are caused to correspond to each other and stored in the predetermined table of the evaluation criteria storage unit 104f.

Information such as a customer name or a device number is identification information to uniquely specify an object. It is not meaningful that the degree of matching between the evaluation criterion based on the information and the evaluation criterion average $B_0$ is determined. For this reason, with respect to the pieces of information, the degrees of matching are not determined The customer environment estimating process unit 105 may determine the deviations in units of customers. In this case, since determinations of deviations of the customer name, the industry type of the customer, the address, and the device number are meaningless, the determinations are not performed. In addition, when the customers register terminal devices to be managed of the plurality of type names with respect to the type name, the customers are classified by the number of registered devices (user who holds a large number of devices or user who holds several devices). In units of the classification, and in units classified with respect to other attributes, evaluation criteria are created, and deviations are determined on the basis of the evaluation criteria and the evaluation criterion average.

With respect to the type name, except for the number of registered devices, the maximum number of registered machine types may be used as a criterion for classification. Furthermore, the type names can be classified by checking whether devices have certain constituent parts. With respect to a service period, similarly, deviations are determined.

In this manner, in reception of an error message, when a customer of a transmission source is a customer having a deviation, a "customer" itself can be used as a criterion for determining whether handling is necessary or unnecessary.

In reception of an error message, the customer environment estimating process unit 105 reads an evaluation criterion to the message on the basis of the evaluation criterion calculated as described above, and combines the evaluation criteria to estimate a customer environment.

For example, when an industry type, an address, a type name, and a service period displayed on the received error message have deviations, a combination value Bresult1 of the evaluation criteria is calculated according to the following equation:

[Equation 9]

$$B_{result1} = \sum_{i=0}^{4} \alpha_i \times B_i \qquad (9)$$

WHERE $$\alpha_i \geq 0 \sum_{i=0}^{4} \alpha_i = 1$$

In this equation, $\alpha i$ denotes a weighting coefficient of each evaluation criterion Bi. All the $\alpha i$ may be equal to each other. The coefficient $\alpha i$ may be an inverse number of a ratio of each evaluation criterion Bi to a sum of the degrees of matching of all the evaluation criteria Bi. In this manner, a difference between tendencies, i.e., the lowness of the degree of matching can be further emphasized. The coefficient $\alpha i$ may be a value which is in proportion to a ratio of the number of terminal devices to be managed belonging to a parameter fixed to calculate the evaluation criterion Bi to the total number of terminal devices to be managed for which the evaluation criterion average is to be calculated.

A term of $B_0$ is included in Equation (9) for the following reasons. The reasons are to incorporate an influence of an average tendency which is not extracted as an environmental factor and to prevent the combination value Bresult1 from being 0 when there is no deviation of the evaluation criterion caused by the environmental factor (i.e., Bi ($1 \leq i$)=0). Furthermore, the reason is to prevent the influence from being excessively reflected when the number of samples is small, even though a deviation of the evaluation criterion caused by the environmental factor is extracted. A curve of the combination value Bresult1 calculated as described above is as shown in, for example, FIG. 26.

Up to now, a deviation of an evaluation criterion obtained when an attribute value is fixed by using each customer information is extracted. However, since the number of generated failures or the number of times of issuance of error messages itself has a deviation, the deviations will be calculated below Although the number of generated failures will be described below. The same concept is applied to the number of times of issuance of error messages.

Customers are classified by the number n of generated failures E in a past designated period (or range of the number of generated failures). If necessary, a value of another attribute X is fixed to "y", and a ratio C of the number of customers to the value "y" is calculated. The ratio C is expressed by the following equation:

[Equation 10]

$$C = GnE(f_{x=y}) \qquad (10)$$

In fx=y, by using relative extraction, not only the value "y" of X itself, but also "Tokyo-to" calculated from, for example, X=address and y="Tokyo-to Shinjyuku-ku" can be used.

When a customer distribution calculated as described above is deviated, GnE itself can be used as an evaluation criterion. For example, on the basis of a relationship between the number n of generated failures E in the designated period and the customer, the customer may be classified by a tendency of the number n of generated failures E. When a single customer can employ the numbers of generated failures, the latest number of generated failures may be employed, or an average of the numbers of generated failures may be employed from the point of a range wherein data to be obtained is measurable.

It is assumed that a distribution of the numbers of generated failures is divided by three such that S1 and S2 are determined by the following equation when a variance of the distribution is represented by $\alpha$. The dividing method is not limited to the above method. Another method may be employed.

[Equation 11]

$S_1$=NUMBER OF GENERATED FAILURES OF ALL CUSTOMERS+$\sigma^2$ $S_2$=NUMBER OF GENERATED FAILURES OF ALL CUSTOMERS-$\sigma^2$ \qquad (11)

Figure 23:
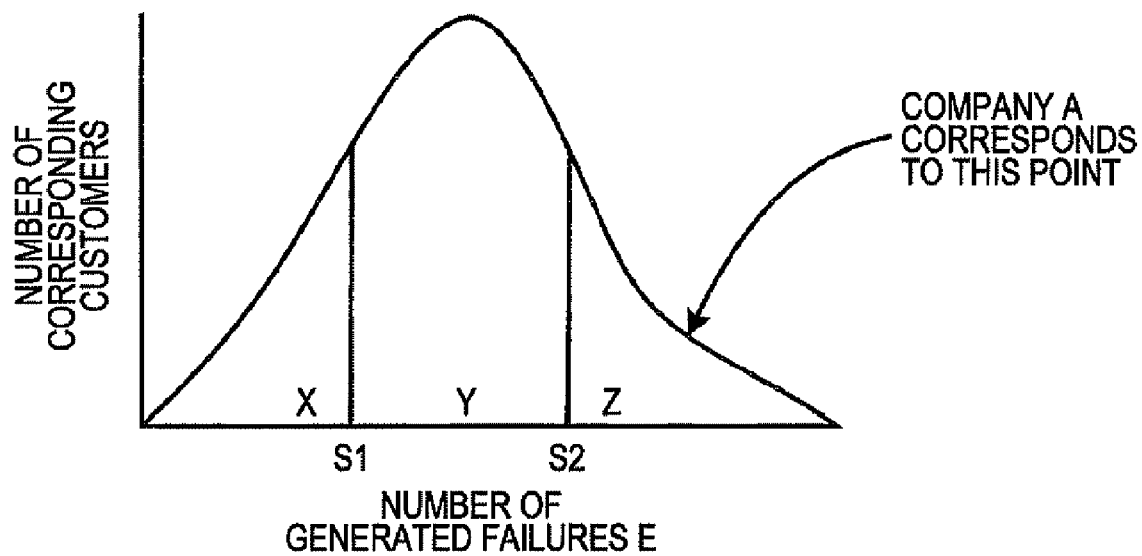
FIG. 23 is a diagram showing a deviation of a failure occurrence tendency.

For example, as shown in FIG. 23, if A company which is a customer for which an evaluation criterion is calculated belongs to a group Z of divided distributions of the numbers of generated failures, only a tendency of the group Z to which A company which is a customer is a target for calculating the evaluation criterion. On the basis of the tendency of the number of generated failures, deviations of the evaluation criteria of the attributes are calculated.

Figure 24:
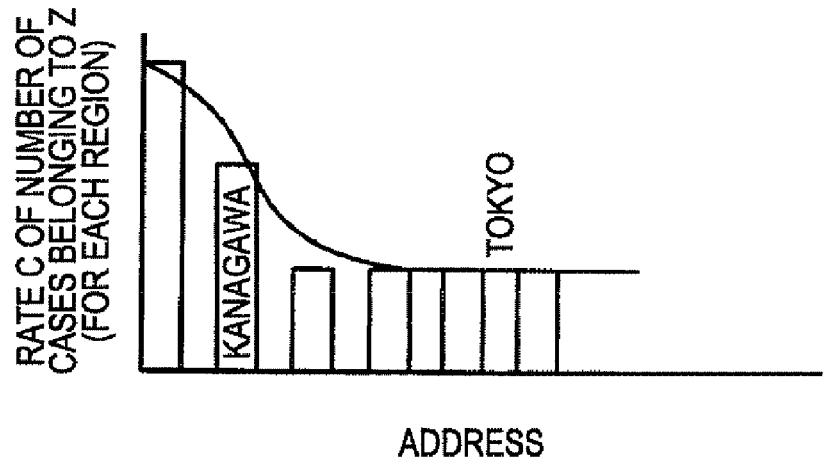
FIG. 24 is a diagram showing an example of the deviation of the failure occurrence tendency.

More specifically, attribute classification of the group Z is checked. First, a ratio of cases of the group Z obtained by addresses is examined. For example, it is assumed that the examination result is as shown in FIG. 24. If a deviation by the addresses is too large to neglect an influence, the following expression expressing the deviation is established.

[Equation 12]

$$C = G_2 E(\text{ADDRESS}) \quad (12)$$

Figure 25:
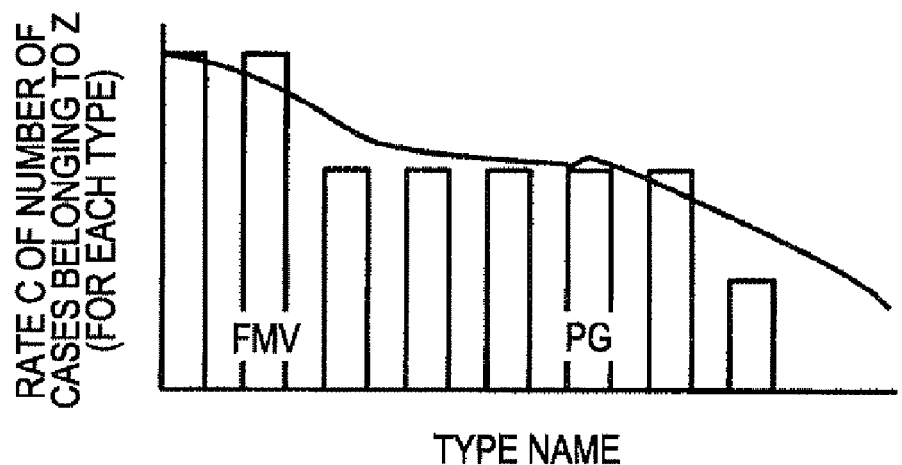
FIG. 25 is a diagram showing an example when the failure occurrence tendency is not deviated.
Figure 26:
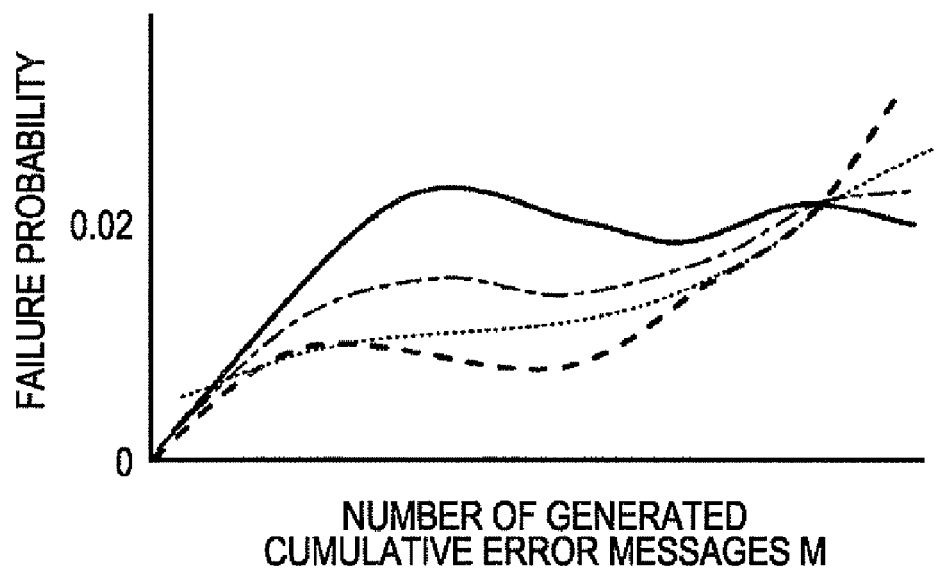
FIG. 26 is a diagram showing a distribution of failure probabilities (uncorrected by a failure occurrence tendency)

For example, GzE (Kanagawa-ken)=0.8 and GzE (Tokyo-to)=0.5 are given. Similarly, examinations to attributes except for the address are repeated. For example, when an examination result as shown in FIG. 25 is obtained with respect to a type name, there is no deviation, and an influence can be neglected.

A method of checking the deviation described above is a method of checking whether a tendency of the evaluation criterion is deviated from the average of the evaluation criteria (whether there is a deviation) when the type name is fixed. However, in this case, the type name is considered as a characteristic feature which influences the level of a failure rate. For this reason, when it is determined when the type name is determined to influence the level of the failure rate, both the influences to the deviation of the evaluation criterion and the failure rate must be considered.

When it is confirmed that there is a deviation of the number of generated failures based on addresses, the combination value Bresult1 of the evaluation criteria is corrected into $B_{result2}$.

[Equation 13]

$$B_{result2} = B_{result1} + \text{Box}\left\{ \frac{G_Z E\left(\begin{array}{c}\text{ADDRESS TO WHICH}\\\text{CUSTOMER BELONGS}\end{array}\right)}{\text{AVERAGE}(G_Z E(\text{EACH ADDRESS}))} - 1 \right\} \quad (13)$$

In this case, "Average" expresses an average of all the addresses of "GzE (Each address)". The effect of Equation (13) is that "an attribute having a small number of generated failures is functioned to decrease a failure rate". Any correction method which conforms to the effect may be used.

For example, when GzE (Tokyo-to)=0.5 and ΣGzE (each address)=0.7, as Equation (13), the following equation is concretely given:

[Equation 14]

$$B_{result2} = B_{result1} - \frac{2}{7} Bo \quad (14)$$

Figure 27:
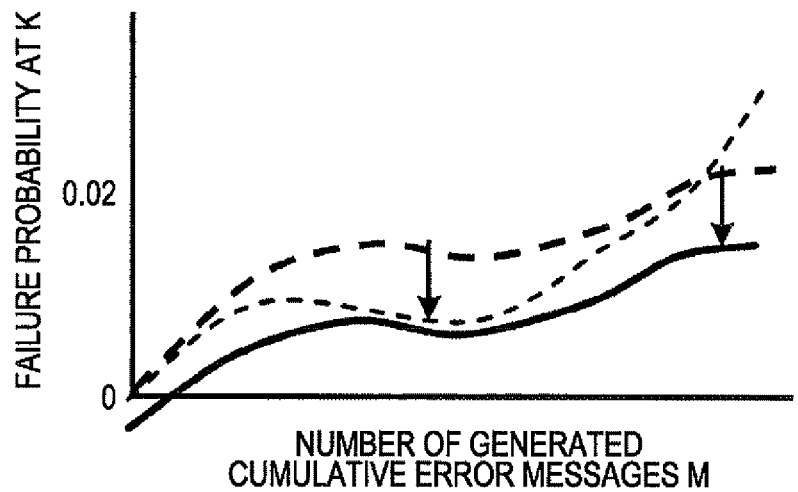
FIG. 27 is a diagram showing a distribution of failure probabilities (corrected by a failure occurrence tendency)

More specifically, as shown in FIG. 27, the distribution of failure probabilities is corrected from Bresult1 to Bresult2 which is lower than Bresult1.

When the final combination value $B_{result2}$ of the evaluation criteria is calculated as described above, the combination value $B_{result2}$ is given to the handling necessary/unnecessary determining process unit 106. The handling necessary/unnecessary determining process unit 106 compares the combination value $B_{result2}$ with a handling necessary/unnecessary criterion stored in the handling necessary/unnecessary criterion storage unit 104g to determine whether handling is necessary or unnecessary. When the handling is necessary, the handling necessary/unnecessary determining process unit 106 displays information representing that the handling is necessary on the display unit 107. However, when the handling is unnecessary, the handling necessary/unnecessary determining process unit 106 does not display any information on the display unit 107. Alternatively, when it is determined that the handling is unnecessary, the handling necessary/unnecessary determining process unit 106 may identifiably display information representing that the handling is unnecessary on the display unit 107.

Figure 28:
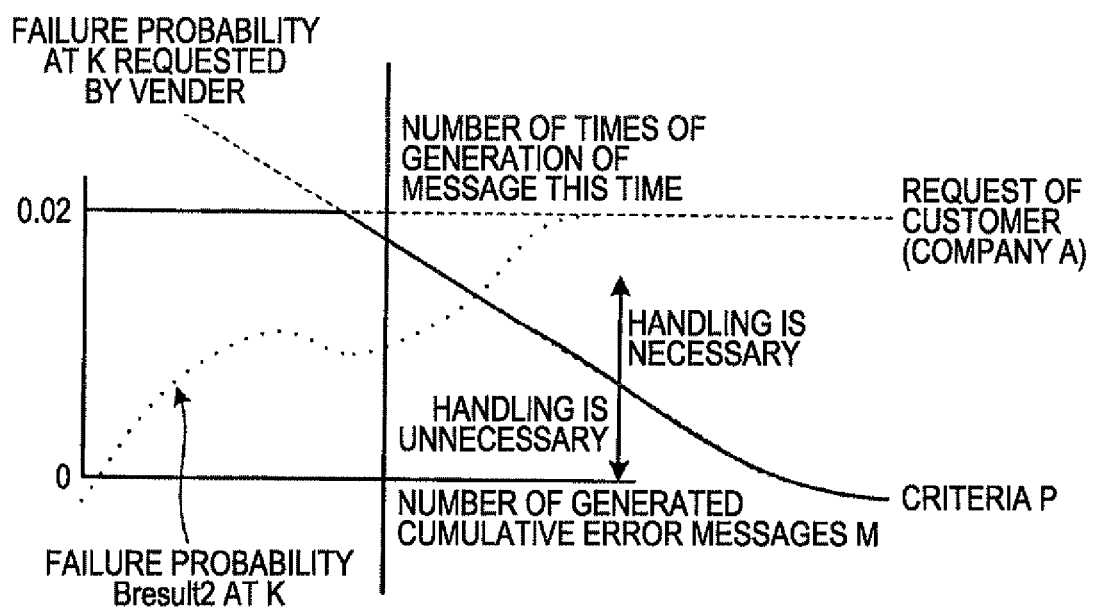
FIG. 28 is a diagram showing an example of a handling necessary/unnecessary criterion.

The handling necessary/unnecessary criterion stored in the handling necessary/unnecessary criterion storage unit 104g is as shown in, for example, FIG. 28. A curve indicated by a solid line in FIG. 28 is represented by P, it is determined that the handling is necessary when $B_{result2} \geq P$, and it is determined that the handling is unnecessary when Bresult2<P. Even though the handling is unnecessary, the history may be stored as history information.

The curve P expressing a threshold value of the handling necessary/unnecessary criterion is determined in consideration of two requests, i.e., a demand by a customer and a request from a vender of a terminal device to be managed. The two demands or requests are independently set. A smaller value of the two demands and the requests in the number of times of accumulated issuance of error messages M is consequently employed as a value of P.

A configuration of the terminal device to be managed according to the first embodiment will be described below. FIG. 9 is a functional block diagram showing a configuration of a terminal device to be managed 200a according to the first embodiment. As shown in FIG. 9, the terminal device to be managed 200a has devices to be managed 201a1, ..., 201an and an error message transmitting process unit 202a.

The devices to be managed 201a1, ..., 201an are various devices serving as constituent parts built in the terminal device to be managed 200a, for example, a magnetic storage device, a CPU (Central Processing Unit), and the like. When the error message transmitting process unit 202a manages the devices to be managed 201a1, ..., 201an. When the error message transmitting process unit 202a receives a failure report from any one of the devices to be managed 201a1, ..., 201an, the error message transmitting process unit 202a generates an error message to transmit the error message to the management server apparatus 100a.

Figure 10:
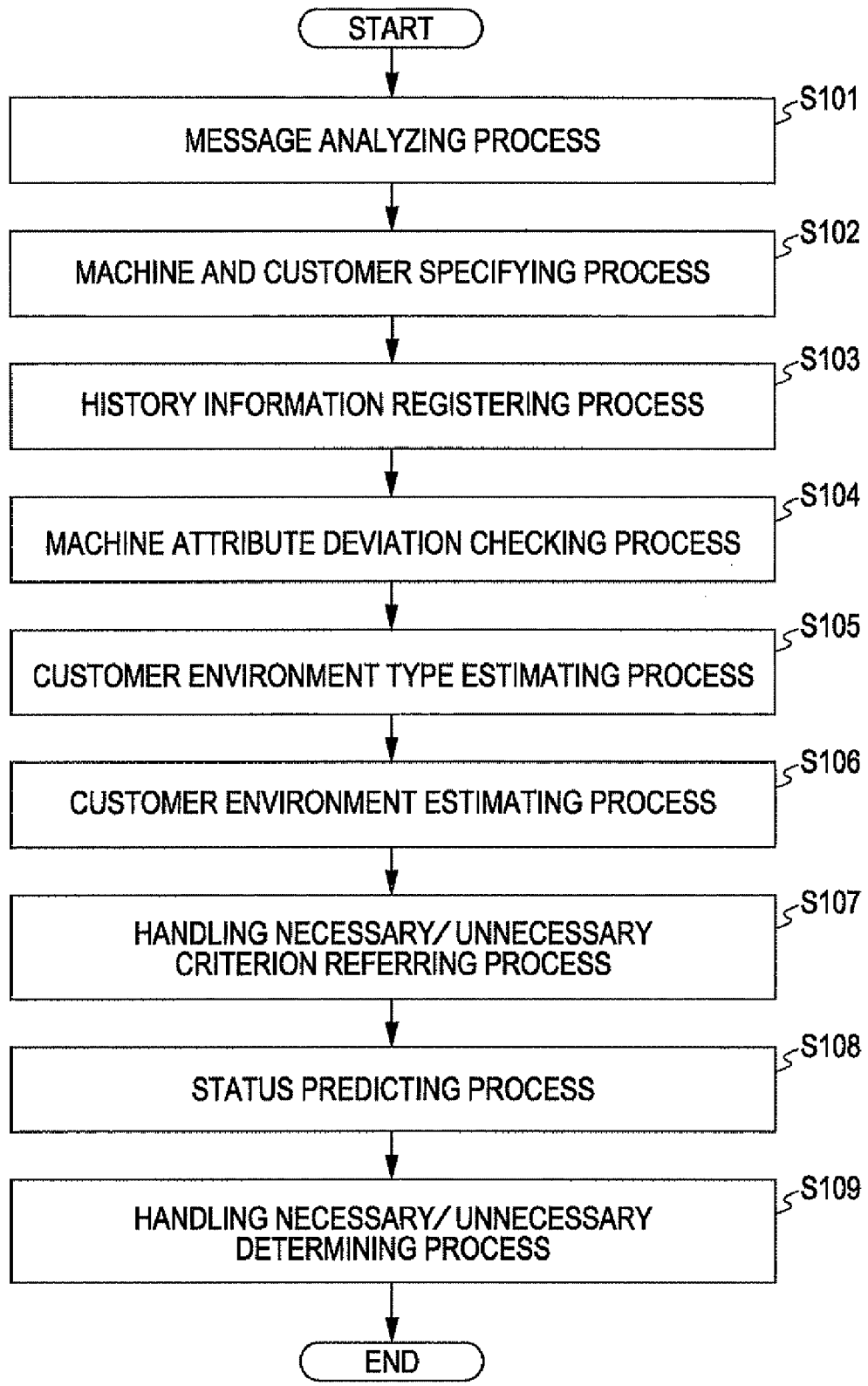
FIG. 10 is a flow chart showing an error message handling necessary/unnecessary determining procedure executed by the management server apparatus according to the first embodiment.

An error message handling necessary/unnecessary determining process executed by the management server apparatus according to the first embodiment will be described below. FIG. 10 is a flow chart showing an error message handling necessary/unnecessary determining procedure executed by the management server apparatus according to the first embodiment. As shown in FIG. 10, first, the message analyzing process unit 101 of the management server apparatus 100a executes a message analyzing process (operation S101). More specifically, an error message received in a mail format from the terminal device to be managed 200a is analyzed to make it possible to specify a header information and a mail text.

Subsequently, the machine and customer specifying process unit 102 specifies attributes of a machine and a customer (operation S102). The history information registering process unit 103 registers an error message in which the attributes of the machine and the customer are specified by the machine and customer specifying process unit 102 in the error message storage unit 104d as history information of the error message (operation S103).

Subsequently, the customer environment estimating process unit 105 performs a machine attribute deviation check process (operation S104). More specifically, a deviation of the evaluation criterion is calculated. Subsequently, the customer environment estimating process unit 105 performs a customer environment type estimating process (operation S105). More specifically, deviations of the number of generated failures and the number of times of insurance of error messages itself are calculated. Subsequently, the customer environment estimating process unit 105 performs a customer environment estimating process on the basis of the deviation of the evaluation criteria and the deviations of the number of generated failures and the number of times of insurance of error messages itself (operation S106).

Subsequently, the handling necessary/unnecessary determining process unit 106 refers to the handling necessary/unnecessary criterion storage unit 104g (operation s107) and performs a status predicting process for prediction of a failure occurrence date or the like (operation S108). The handling necessary/unnecessary determining process unit 106 performs a handling necessary/unnecessary determining process to determine whether handling is necessary or unnecessary (operation S109).

According to the embodiment, a tendency included in information extracted by an information extracting procedure is compared with a tendency included in information stored by a received information storing procedure to extract a difference therebetween. For this reason, uniqueness of information generated by the device to be managed can be recognized.

According to the embodiment, the tendency included in the information extracted by the information extracting procedure is compared with a tendency included in the information stored by received information storing procedure, and, on the basis of the difference therebetween, an environment in which the device to be managed is installed is estimated. The estimated environment is compared with a predetermined handling necessary/unnecessary criterion, and necessity of handling of the device to be managed is notified on the basis of a handling necessary/unnecessary determining result to the device to be managed. For this reason, when handling of the device to be managed is unnecessary, notification is not performed, a load on a user of the device to be managed and an administrator of the management server apparatus is reduced, and personnel is suppressed from being unnecessarily sent. For this reason, the management cost can be advantageously reduced.

According to the embodiment, when information having a predetermined degree of importance, for example, a low degree of importance is transmitted from the device to be managed, a probability of generating a state in which the information is transmitted is calculated. Only when the probability is equal to or larger than a predetermined handling necessary/unnecessary criterion, the device to be managed is notified that handling of the device to be managed is necessary. For this reason, a user of the device to be managed is released from a troublesome operation of performing handling by information having a predetermined degree of importance although the handling is unnecessary, and loads on the user of the device to be managed and the administrator of the management server apparatus are reduced, and personnel is suppressed from being unnecessarily sent. For this reason, the management cost can be advantageously reduced.

Second Embodiment

The second embodiment will be described below with reference to FIGS. 11 to 19. An outline of the second embodiment is as follows. A management server apparatus accumulates error messages which notifies of a warning or an error such as a failure received from a terminal device to be managed. The accumulated error messages are analyzed on the basis of a customer environment in which the terminal device to be managed is installed or a customer attribute to calculate an error occurrence tendency based on the environment or the customer attribute. The customer environment is estimated by using a difference between the calculation result and the error occurrence tendency exhibited by all the error messages as an evaluation criterion. On the basis of a result obtained by comparing the estimated customer environment and a predetermined handling necessary/unnecessary criterion, an error message transmission condition serving as a criterion for determining handling and checking to a customer is generated.

The management server apparatus compares the newly generated error message transmission condition with an error message transmission condition stored in the past depending on a request from the terminal device to be managed. When the condition is changed, the newly generated error message transmission condition is transmitted to the terminal device to be managed. When the terminal device to be managed receives the newly generated error message transmission condition, the terminal device to be managed updates an error message transmission condition stored therein by the newly generated error message transmission condition. The terminal device to be managed, subsequently, on the basis of the newly generated error message transmission condition, determines whether the error message is transmitted to the management server apparatus. When it is determined that the error message is transmitted, the terminal device to be managed transmits the error message to the management server apparatus. When it is not determined that the error message is transmitted, the error message is not transmitted to the management server apparatus. More specifically the second embodiment is an embodiment in which a terminal device to be managed has a function of screening an error message.

A configuration of a management server apparatus according to the second embodiment will be described below. FIG. 11 is a functional block diagram showing the configuration of the management server apparatus according to the second embodiment. A management server apparatus 100b according to the second embodiment has, in addition to the same configuration as that of the management server apparatus 100a of the first embodiment, a function of generating an error message transmission condition. In FIG. 11, only a characteristic portion of the management server apparatus 100b according to the second embodiment will be mentioned, and the other configuration will be omitted.

The second embodiment is based on the assumption that error messages are sufficiently accumulated in an error message history storage unit 104e and evaluation criteria based on a history of the error messages are calculated in advance and stored in the evaluation criteria storage unit 104f. When the evaluation criteria are not stored in the evaluation criteria storage unit 104f, calculation and storage of an evaluation criterion are performed when an error message transmission condition is received from the terminal device to be managed. In this process, it is assumed that an error message having the latest edition number is used.

As shown in FIG. 11, the management server apparatus 100b according to the second embodiment has a message analyzing process unit 101, a machine and customer specifying process unit 102, a storage unit 104, and an error message transmission condition generating process unit 108.

The message analyzing process unit 101 analyzes an error message transmission condition updating request received through an electronic mail from the terminal device to be managed and verifies the proprieties of a mail header and a mail text to check whether a proper content is transmitted from a proper transmission source.

For example, the error message transmission condition updating request is transmitted from the terminal device to be managed in a format as shown in FIG. 17A. The error message transmission condition updating request has a structure formed such that an identifier ("Update Request") indicating an error message transmission condition updating request, a unit ID obtained by combining a device name and a type name, a request generation date, request generation time, an edition number of an error message transmission condition stored in the terminal device to be managed, and the like are separated in a comma separated value format.

The error message transmission condition updating request of the format shown in FIG. 17A is converted into a mail having a mail format added with a "From" header and a "To" header shown in FIG. 17B. The mail is transmitted from the terminal device to be managed to the management server apparatus 100b through a network.

In the management server apparatus 100b, the mail of the format shown in FIG. 17B is received, the message analyzing process unit 101 analyzes the received mail. On the basis of analysis results of a transmission source IP address, a mail header, and a mail text, "Update Request", customer information (customer name, address, and industry type), machine information of a terminal device to be managed (device name, type name, machine type name, and device number), a registration date, a service start date, and the like are determined. The analysis result of the received mail is as shown in, for example, FIG. 17C.

Since the machine and customer specifying process unit 102 is the same as that described in the first embodiment, a description thereof will not be repeated here. A storage unit 104 includes a machine information storage unit 104a, a machine corresponding information storage unit 104b, a customer information storage unit 104c, an error message history storage unit 104e, evaluation criteria storage unit 104f, a handling necessary/unnecessary criterion storage unit 104g, and an error message transmission condition storage unit 104h. Since the machine information storage unit 104a, the machine corresponding information storage unit 104b, the customer information storage unit 104c, the evaluation criteria storage unit 104f, and the handling necessary/unnecessary criterion storage unit 104g are the same as those described in the first embodiment, a description thereof will not be repeated here.

An error message history stored in the error message history storage unit 104e of the management server apparatus 100b, as shown by an example of an error message history table in the second embodiment in FIG. 12, a column of "edition number" is added to the error message history table of the first embodiment. This "edition number" is an "edition number" of an error message transmission condition obtained when the error message is transmitted from the terminal device to be managed. When the edition number is new, it is understood that the error message is transmitted on the basis of a new error message transmission condition.

The error message transmission condition storage unit 104h is storage means which stores an error message transmission condition. As shown by an example of the error message transmission condition of the second embodiment in FIG. 13, the error message transmission condition is stored in a manner wherein, message transmission condition items which can serve as determination items for message transmission conditions and message transmission conditions corresponding to the items are stored in units of customer IDs and machine IDs.

For example, as a message transmission condition item and a message transmission condition, "edition number"="1", "temperature"="38° C. or more", "CPU utilization"="80% or more", "memory leak"="presence", "number of transmitted error messages"="30 or more", and the like are given. This means that, when "temperature is 38° C. or more", "CPU utilization is 80% or more", "memory leak is generated", or "the number of transmitted error messages is 30 or more", an error message is transmitted from the terminal device to be managed to the management server apparatus.

An error message transmission condition registered in the table shown in FIG. 13 is an error message transmission condition which is transmitted in advance to a terminal device to be managed specified by the customer ID and the machine ID. More specifically, the terminal device to be managed specified by the customer ID and the machine ID determines whether an error message is transmitted on the basis of the error message transmission condition registered in the table shown in FIG. 13.

When a machine and a customer of a transmission source of an error message are specified by the machine and customer specifying process unit 102, the error message transmission condition generating process unit 108 reads a deviated evaluation criterion corresponding to the specified machine and the specified customer from the evaluation criteria storage unit 104f. In this case, an evaluation criterion based on an attribute different from an attribute held by a terminal device to be managed specified by the machine ID of the customer is excluded.

The error message transmission condition generating process unit 108 compares the evaluation criteria with a handling necessary/unnecessary criterion stored in the handling necessary/unnecessary criterion storage unit 104g without combining the evaluation criteria. In this case, the evaluation criterion, like the evaluation criterion described in the first embodiment, is expressed as a function which outputs a failure probability by using the number of times of issuance of the error message as an argument. The error message transmission condition generating process unit 108 compares the evaluation criterion value with a handling necessary/unnecessary determination condition to specify the number of times of issuance of a message which is required to be handled (or a range of the number of times of issuance of the message). In this manner, when the number of times of issuance of the message which is required to be handled (or the range of the number of times of issuance of the message) is specified, the terminal device to be managed is controlled not to transmit the error message until the number of times of issuance of the message (or the range of the number of times of issuance of the message) becomes a specific number. In this manner, an error message transmission condition item "the number of transmitted error messages" of the error message transmission condition is updated. With respect to other error message transmission condition items, similarly, transmission conditions are updated to suppress transmission of an error message.

When the error message transmission condition can be expressed by binary data, i.e., "on" and "off", the error message transmission condition may be turned on or off to suppress transmission of an error message (for example, when the message transmission condition item is "memory leak" or the like). When the error message transmission condition is expressed by a threshold value, the error message transmission condition may be gradually switched in units of the threshold value to suppress transmission of the error message (for example, when the message transmission condition item is "temperature" or the like, the error message transmission condition is changed every 0.5° C. to suppress transmission of a message).

The error message transmission condition newly generated as described above is stored in the error message transmission condition storage unit 104h by the error message transmission condition generating process unit 108. At this time, since the error message transmission condition is uniquely determined by specifying a customer ID and a machine ID, when the same customer ID and the same machine ID are present, a record is updated such that the edition number is increased by one. The newly generated error message transmission condition is stored in the error message transmission condition storage unit 104h by the error message transmission condition generating process unit 108 and transmitted to the terminal device to be managed.

Figure 14:
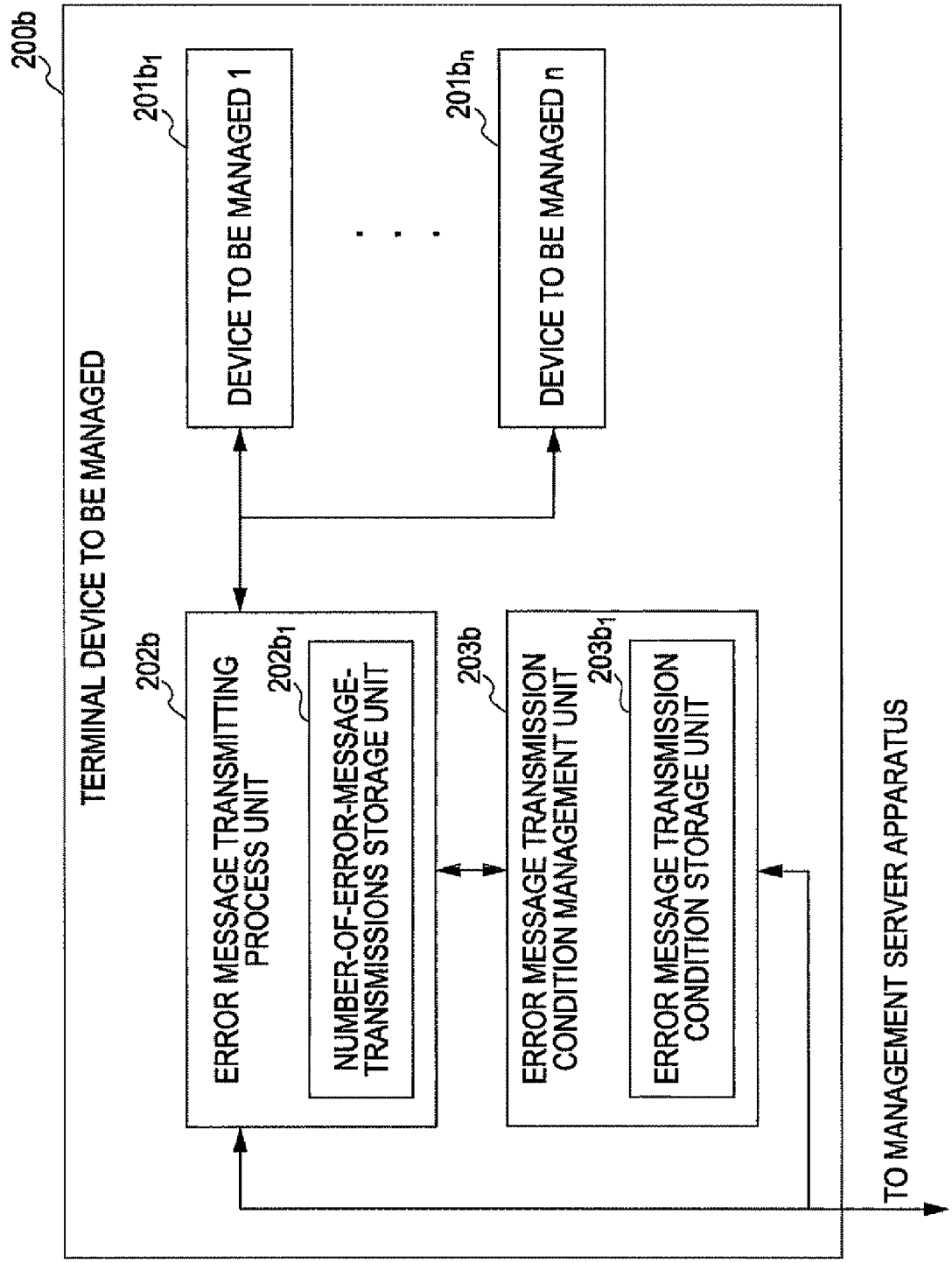
FIG. 14 is a functional block diagram showing a configuration of a terminal device to be managed in the second embodiment.

A configuration of the terminal device to be managed according to the second embodiment will be described below. FIG. 14 is a functional block diagram showing a configuration of the terminal device to be managed according to the second embodiment. As shown in FIG. 14, a terminal device to be managed 200b according to the second embodiment has devices to be managed 201b1 to 201bn, an error message transmitting process unit 202b, and an error message transmission condition management unit 203b. Since the devices to be managed 201b1 to 201bn are the same as the devices to be managed 201a1 to 201an described in the first embodiment, respectively, a description thereof will not be repeated here.

The error message transmitting process unit 202b manages the devices to be managed 201b1 to 201bn. When a failure report is received from any one of the devices to be managed 201b1 to 201bn, the error message transmitting process unit 202b refers to an error message transmission condition stored in the error message transmission condition management unit 203b. When the error message transmission condition is satisfied, the error message transmitting process unit 202b generates an error message to transmit the error message to the management server apparatus 100b. In the transmission of the error message, the numbers of transmitted error messages are stored in number-of-error-message-transmissions storage unit 202b1 in units of message contents. A number-of-error-message-transmissions storage table which stores the number of transmitted error messages, for example, as shown in FIG. 15, stores the number of times of transmission for each error message code. The number of transmitted error messages is used when it is determined whether the "number of transmitted error messages" of the error message transmission condition is satisfied.

The error message transmission condition management unit 203b has an error message transmission condition storage unit 203b1. The error message transmission condition storage unit 203b1 stores the latest error message transmission condition transmitted from the management server apparatus 100b. An example of an error message transmission condition table in which the error message transmission condition stored by the error message transmission condition storage unit 203b1 is shown in FIG. 16. When a failure report is received from any one of the devices to be managed 201b1 to 201bn, the error message transmitting process unit 202b generates an error message to transmit the error message to the management server apparatus 100b when the error message transmission condition is satisfied with reference to the error message transmission condition stored in the error message transmission condition storage unit 203b1.

Figure 18:
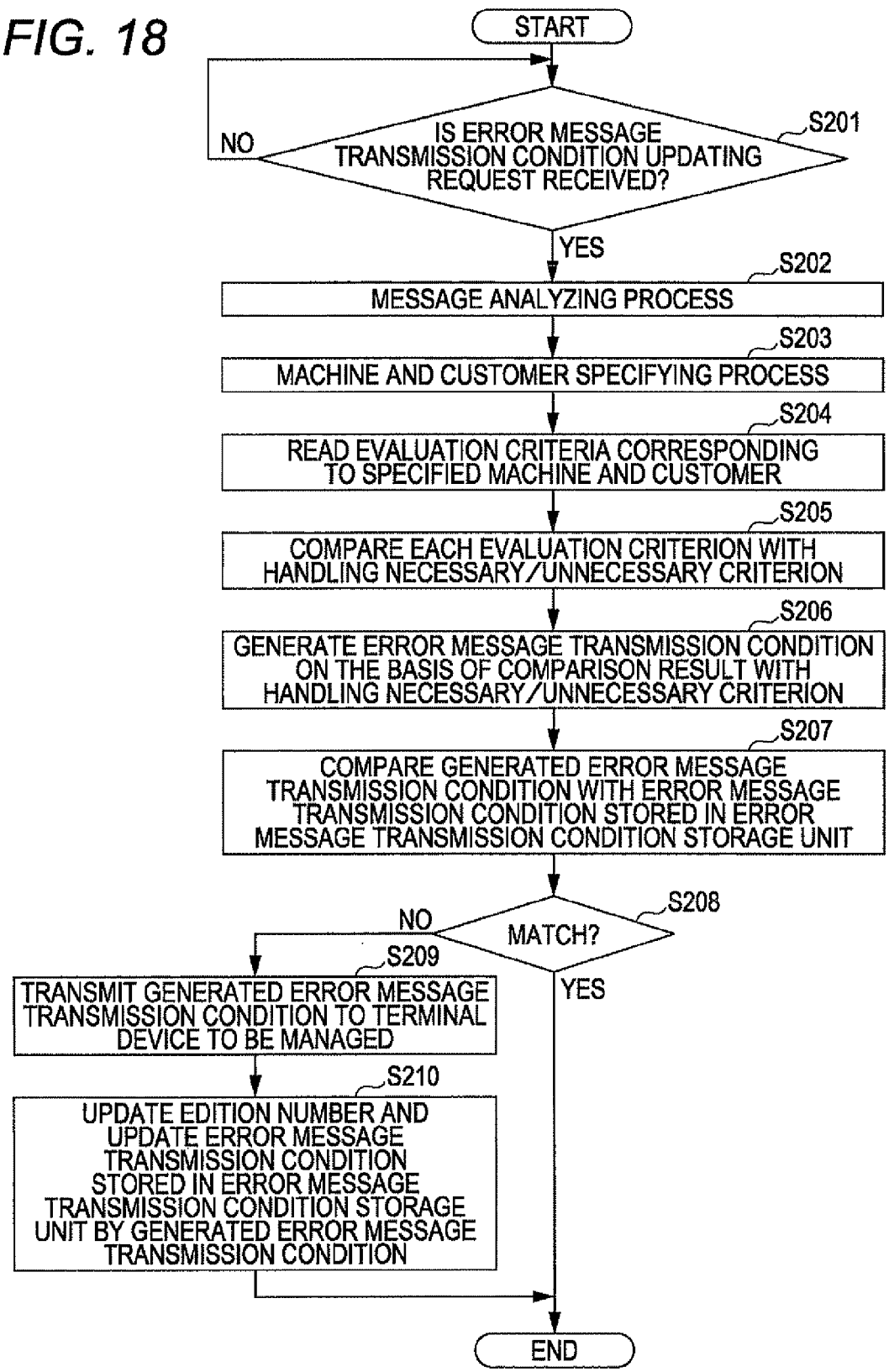
FIG. 18 is a flow chart showing an error message transmission condition generating procedure executed by the management server apparatus according to the second embodiment.

Subsequently, an error message transmission condition generating process executed by the management server apparatus according to the second embodiment will be described below. FIG. 18 is a flow chart showing an error message transmission condition generating procedure executed by the management server apparatus according to the second embodiment. As shown in FIG. 18, the message analyzing process unit 101 of the management server apparatus 100b determines whether the error message transmission condition updating request is received from the terminal device to be managed 200b (operation S201). When the error message transmission condition updating request is received (Yes in operation S201), the message analyzing process unit 101 shifts to operation S202. When the error message transmission condition updating request is not received (No in operation S201), the message analyzing process unit 101 repeats operation S201.

Subsequently, the message analyzing process unit 101 executes a message analyzing process (operation S202). More specifically, the message analyzing process unit 101 analyzes an error message received from the terminal device to be managed 200b in the mail format to enable header information and a mail text to be specified.

The machine and customer specifying process unit 102 specifies attributes of a machine and a customer (operation S203). The error message transmission condition generating process unit 108 reads evaluation criterion corresponding to the machine and the customer specified by the machine and customer specifying process unit 102 from the evaluation criteria storage unit 104f (operation S204). The error message transmission condition generating process unit 108 compares each evaluation criterion read in operation S204 with a handling necessary/unnecessary criterion stored in the handling necessary/unnecessary criterion storage unit 104g (operation S205).

The error message transmission condition generating process unit 108 generates an error message transmission condition on the basis of the comparison results between the evaluation criteria and the handling necessary/unnecessary criterion (operation S206). The error message transmission condition generating process unit 108 compares the generated error message transmission condition and the error message transmission condition stored in the error message transmission condition storage unit 104h (operation S207).

The error message transmission condition generating process unit 108 determines whether the error message transmission condition generated in operation S206 matches with the error message transmission condition stored in the error message transmission condition storage unit 104h (operation S208). When the error message transmission condition generated in operation S206 is the same as the error message transmission condition stored in the error message transmission condition storage unit 104h (Yes in operation S208), the error message transmission condition generating process is ended. On the other hand, when the error message transmission condition generated in operation S206 is not the same as the error message transmission condition stored in the error message transmission condition storage unit 104h (No in operation S208), the error message transmission condition generating process unit 108 shifts to operation S209.

In operation S209, the error message transmission condition generating process unit 108 transmits the generated error message transmission condition to the terminal device to be managed which transmits the error message transmission condition updating request (operation S209). Subsequently, the edition number is updated, and the error message transmission condition stored in the error message transmission condition storage unit 104h is updated under the error message transmission condition newly generated in operation S206 (operation S210).

Figure 19:
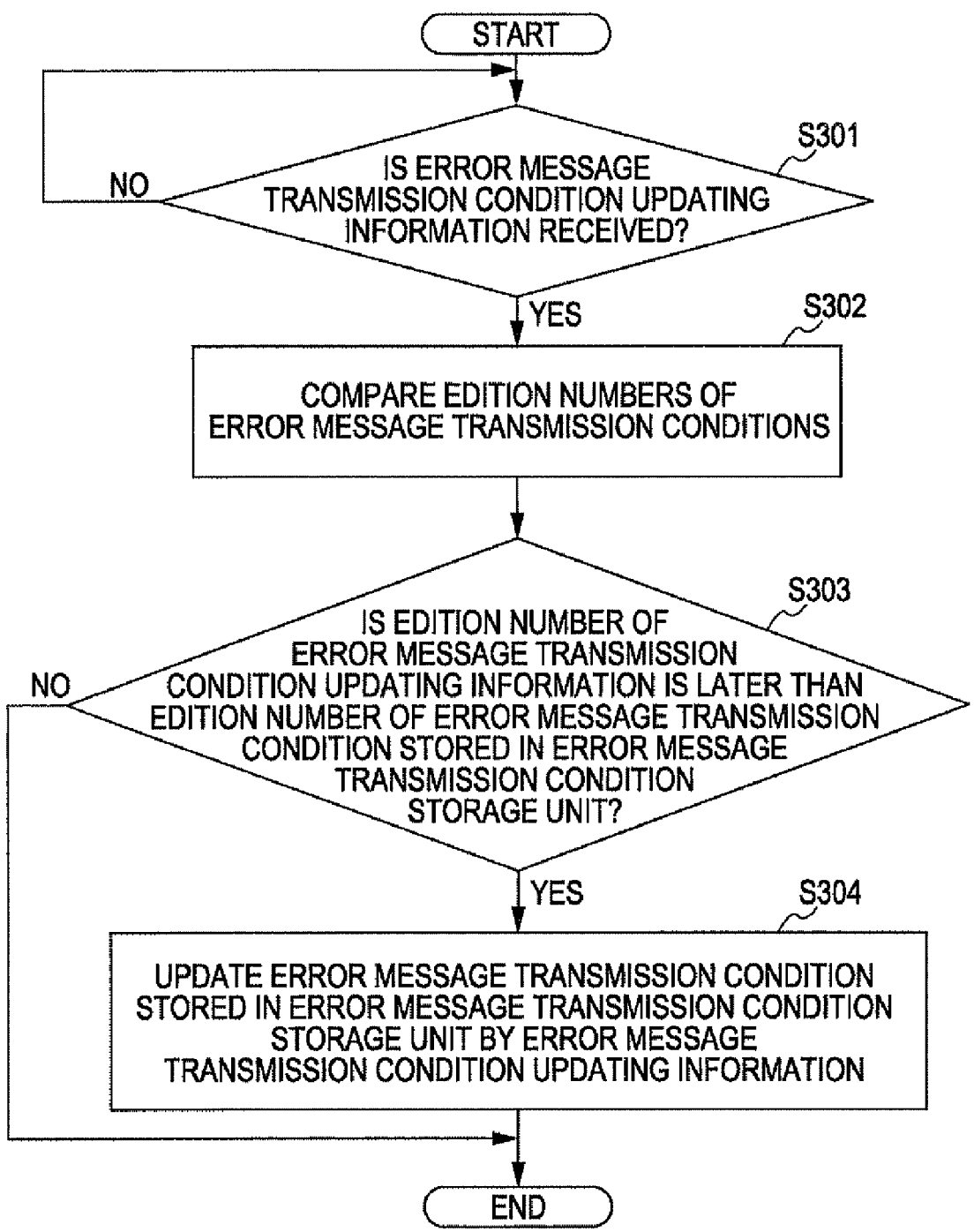
FIG. 19 is a flow chart showing an error message transmission condition updating procedure executed by the terminal device to be managed according to the second embodiment.

An error message transmission condition updating process executed by the terminal device to be managed according to the second embodiment will be described below. FIG. 19 is a flow chart showing an error message transmission condition updating procedure executed by the terminal device to be managed according to the second embodiment As shown in FIG. 19, first, the error message transmission condition management unit 203b of the terminal device to be managed 200b determines whether error message transmission condition updating information is received (operation S301).

The error message transmission condition management unit 203b compares an edition number of the error message transmission condition updating information received from the management server apparatus 100b with an edition number of the error message transmission condition stored in the error message transmission condition storage unit 203b1 (operation S302).

The error message transmission condition management unit 203b determines whether the edition number of the error message transmission condition updating information received from the management server apparatus 100b is later than the edition number of the error message transmission condition stored in the error message transmission condition storage unit 203b1 (operation S303). When the edition number of the error message transmission condition updating information received from the management server apparatus 100b is later than the edition number of the error message transmission condition stored in the error message transmission condition storage unit 203b1 (Yes in operation S303), the error message transmission condition management unit 203b shifts to operation S304. When the edition number of the error message transmission condition updating information received from the management server apparatus 100b is not later than the edition number of the error message transmission condition stored in the error message transmission condition storage unit 203b1 (No in operation S303), the error message transmission condition updating process is ended.

In operation S304, the error message transmission condition management unit 203b updates the error message transmission condition stored in the error message transmission condition storage unit 203b1 by the error message transmission condition updating information. Subsequently, on the basis of the updated error message transmission condition, it is determined whether the error message is transmitted to the management server apparatus 100b.

According to the present invention, at a timing arbitrarily set by a user or a preset timing, a tendency held by information extracted by a information extracting procedure and a tendency held by information stored by a received information storing procedure are compared with each other at once to enable a difference therebetween to be extracted, and a processing load on the management server apparatus can be advantageously reduced.

According to the present invention, on a computer device side, information transmitting criterion for determining whether the computer device is required to be notified of information is updated, and the device to be managed is notified of the updated information transmission criterion. For this reason, subsequently to the notification, the device to be managed determines, on the basis of the updated information transmission criterion, whether the computer device is required to be notified of the information. When it is determined that the computer device is not required to be notified of the information, unnecessary handling is suppressed from being executed, loads on a user of the device to be managed and an administrator of the management server apparatus are reduced, and the management cost can be advantageously reduced.

According to the present invention, depending on a request from the device to be managed, or by the notification from the computer device, the information transmission criterion stored in the device to be managed can be updated.

The embodiments are described above. However, the present invention is not limited to the embodiments, and the present invention can be executed by various different embodiments. The effects of the embodiments are not limited to the above effects of the described embodiments.

In the first and second embodiments, an evaluation criterion (or a combination value of evaluation criteria or a correction value obtained by deviations of the number of generated failures of the evaluation criteria and the number of times of issuance of error messages) is compared with a handling necessary/unnecessary criterion. When the evaluation criterion is the handling necessary/unnecessary criterion or more (or larger than the handling necessary/unnecessary criterion), error occurrence is suppressed from being reported, or the error message transmission condition is updated. The present invention is not limited to the above configuration. Service time of the terminal device to be managed when the terminal device to be managed is handled with respect to a state (error occurrence) in which an error message received from the terminal device to be managed is transmitted and a probability of occurrence of the state are compared with service time of the terminal device to be managed when the terminal device to be managed is not handled with respect to a state in which error information received from the terminal device to be managed is transmitted and a probability of occurrence of the state, respectively. When the service time becomes short or the probability of occurrence of the state becomes higher in the latter case, it is determined that handling of the terminal device to be managed is necessary to report occurrence of an error, otherwise error occurrence may be suppressed from being reported.

According to the present invention, the service time of the device to be managed when the device to be managed is handled with respect to the state in which the information received from the device to be managed is transmitted and the probability of occurrence, and the service time of the device to be managed when the device to be managed is not handled with respect to the state in which the information received from the device to be managed is transmitted and the probability of occurrence are estimated, and the handling is determined to be necessary or unnecessary. For this reason, unnecessary handling can be suppressed from being performed, loads on a user of the device to be managed and an administrator of the management server apparatus can be reduced, and the management cost can be advantageously reduced.

In the first and second embodiment, a difference (deviation) between an evaluation criterion and an evaluation criterion average is determined by the degree of matching or the like. However, the present invention is not limited to this configuration, and it may be determined by using neural network control or a reasoning technique such as MBR (Memory Based Reasoning) whether the handling is necessary or unnecessary.

In the embodiment described above, an electronic device coping with a network connection such that sending of personnel for handling of error occurrence is recognized to be costly is to be managed. When sufficient management information cannot be obtained due to band limiting of the network or low state measurement accuracy of the electronic device, a history of the past same error message is analyzed to an error message (failure message or warning message) which may be unnecessary to be handled to determine whether the error message is necessary to be handled. When the error message is determined to be unnecessary to be handled, the handling is suppressed, and the management cost can be reduced.

Of the processes described in the first and second embodiments, all or some processes to be automatically performed may also be manually performed. Alternatively, all or some processes explained to be manually performed may be automatically performed by a known method. In addition, the information including the procedures, the control procedures, the concrete names, and various data or parameters can be arbitrarily changed unless otherwise stated.

The constituent elements of the devices shown in the drawings are functionally conceptual, and the constituent element need not always be required to be structured as physically shown in the drawings. More specifically, concrete conformations of decentralization and integration of the devices is not limited to that shown in the drawings. All or some devices can be structured such that the devices are functionally or physically decentralized or integrated in arbitrary units depending on various loads or status of use.

All or some processing functions performed by the devices may be realized by a CPU (Central Processing Unit) (or a microcomputer such as an MPU (Micro Processing Unit) or an MCU (Micro Controller Unit)) and a program analyzed and executed by the CPU (or a microcomputer such as an MPU or an MCU) or realized as hardware realized by wired logic.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic device centralized management apparatus which remotely manages a device connected through a network comprising:
   a received information storage unit which stores information received from the device;
   an information extracting unit which extracts information based on a designated attribute of the device from the information stored by the received information storage unit; and
   a comparing unit which compares a tendency held by the extracted information to a tendency held by the stored information to extract a difference therebetween;
   an environment estimation unit which estimates an environment in which the device is installed on the basis of a comparison result obtained by the comparing unit;
   a handling necessary/unnecessary determining unit which compares the environment which is estimated by the environment estimation unit and in which the device is installed to a predetermined handling necessary/unnecessary criterion to determine whether handling of the device is necessary or unnecessary;
   a notification unit which notifies that handling of the device is necessary when the handling necessary/unnecessary determining unit determines that handling of the device is necessary due to a case wherein the environment which is estimated by the environment estimation unit and in which the device is installed is not less than the predetermined handling necessary/unnecessary criterion, wherein
   the information extracting unit extracts information from information of a predetermined degree of importance of information received from the device on the basis of the designated attribute of the device;
   the comparing unit compares a tendency held by the information of the predetermined degree of importance extracted by the information extracting unit with a tendency held by the information of the predetermined degree of importance stored in the received information storage unit;
   the environment estimation unit estimates an environment in which the device is installed on the basis of the comparison result obtained by the comparing unit;
   the handling necessary/unnecessary determining unit calculates a probability of occurrence of a state in which the information of the predetermined degree of importance is transmitted in the environment which is estimated by the environment estimation unit and in which the device is installed, compares the probability with the predetermined handling necessary/unnecessary criterion to determine whether handling of the device is necessary or unnecessary; and
   the notification unit notifies that handling of the device is necessary when the handling necessary/unnecessary determining unit determines that the handling of the device is necessary due to a case wherein the probability of occurrence of the state in which the information of the predetermined degree of importance is transmitted in the environment which is estimated by the environment estimation unit and in which the device is installed is not less than the predetermined handling necessary/unnecessary criterion.

2. The electronic device centralized management apparatus according to claim 1, wherein
   the handling necessary/unnecessary determining unit compares service time of the device when the device is handled with respect to the state in which the information received from the device is transmitted and a probability of occurrence of the state with service time of the device when the device is not handled with respect to the state in which the information received from the device is transmitted and the probability of occurrence of the state to determine whether the handling of the device is necessary or unnecessary.

3. The electronic device centralized management apparatus according to claim 1, wherein
   the comparing unit, at a timing designated to the device by a user or a predetermined timing, compares a tendency held by the information extracted by the information extracting unit and a tendency held by the information stored by the received information storage unit to extract a difference therebetween.

4. An electronic device centralized management method which remotely manages a device connected through a network comprising:
   storing information received from the device;
   extracting information based on a designated attribute of the device from the stored information; and
   comparing a tendency held by the extracted information to a tendency held by the stored information to extract a difference therebetween;

estimating an environment in which the device is installed on the basis of the difference therebetween;

comparing the environment to a predetermined handling necessary/unnecessary criterion to determine whether handling of the device is necessary or unnecessary; and the notifying the device that handling of the device is necessary when handling of the device is necessary because the environment is not less than the predetermined handling necessary/unnecessary criterion;

extracting information of a predetermined degree of importance from information received from the device on the basis of a designated attribute of the device;

comparing a tendency held by the information of the predetermined degree of importance to a tendency held by the stored information of the predetermined degree of importance;

estimating an environment in which the device is installed on the basis of a result of the comparison;

calculating a probability of occurrence of a state in which the information of the predetermined degree of importance is transmitted in the estimated environment and in which the device is installed;

comparing the probability with the predetermined handling necessary/unnecessary criterion to determine whether handling of the device is necessary or unnecessary; and notifying the device that handling of the device is necessary when the probability of occurrence of the state in which the information of the predetermined degree of importance is transmitted in the estimated environment and in which the device is installed is not less than the predetermined handling necessary/unnecessary criterion.

5. The electronic device centralized management method according to claim 4, comprising further:

comparing a service time of the device when the device is handled with respect to the state in which the information received from the device is transmitted and a probability of occurrence of the state to a service time of the device when the device is not handled with respect to the state in which the information received from the device is transmitted and the probability of occurrence of the state; and determining whether the handling of the device is necessary or unnecessary.

6. The electronic device centralized management method according to claim 4, wherein the comparing operation, at a timing designated to the device by a user or a predetermined timing, compares a tendency held by the information extracted by the information extracting operation and a tendency held by the information stored by the received information storage operation to extract a difference therebetween.

* * * * *